United States Patent
Katis et al.

(10) Patent No.: US 8,538,471 B2
(45) Date of Patent: *Sep. 17, 2013

(54) TIME-SHIFTING FOR PUSH TO TALK VOICE COMMUNICATION SYSTEMS

(71) Applicant: Voxer IP LLC, San Francisco, CA (US)

(72) Inventors: Thomas E. Katis, Jackson, WY (US);
Matthew J. Ranney, Oakland, CA (US);
Mary G. Panttaja, San Francisco, CA (US); James T. Panttaja, San Francisco, CA (US)

(73) Assignee: Voxer IP LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/767,780

(22) Filed: Feb. 14, 2013

(65) Prior Publication Data

US 2013/0172038 A1 Jul. 4, 2013

Related U.S. Application Data

(63) Continuation of application No. 12/336,206, filed on Dec. 16, 2008, now Pat. No. 8,401,582.

(60) Provisional application No. 61/044,272, filed on Apr. 11, 2008.

(51) Int. Cl.
*H04B 7/00* (2006.01)
*H04B 7/14* (2006.01)
*H04L 12/58* (2006.01)
*H04M 11/10* (2006.01)

(52) U.S. Cl.
USPC ........ 455/518; 455/519; 455/412.1; 455/413; 455/18

(58) Field of Classification Search
USPC .......................................... 455/518
See application file for complete search history.

(56) References Cited

U.S. PATENT DOCUMENTS

| 4,807,224 A | 2/1989 | Naron et al. |
| 5,117,422 A | 5/1992 | Hauptschein et al. |
| 5,283,818 A | 2/1994 | Klausner et al. |

(Continued)

FOREIGN PATENT DOCUMENTS

| EP | 1694044 A | 8/2006 |
| EP | 1694044 | * 8/2008 |

(Continued)

OTHER PUBLICATIONS

"*dircproxy*," http://home.pcisys.net/~tbc/hacks/dircproxy.htm, Downloaded on Sep. 26, 2008, 1 page.

(Continued)

*Primary Examiner* — Temesgh Ghebretinsae
*Assistant Examiner* — Devan Sandiford
(74) *Attorney, Agent, or Firm* — Beyer Law Group LLP

(57) ABSTRACT

A network communication device located on a Push To Talk (PTT) communication network and configured to provide time-shifting capabilities to a user of a PTT communication device is disclosed. The network communication device includes a receiver configured to progressively receive time-based media. The network communication device also includes a time-shifting buffer for progressively storing the received time based media as the time-based media is received and a time-shifting buffer controller configured to control the rendering of the time-based media at the PTT device.

26 Claims, 11 Drawing Sheets

(56) References Cited

U.S. PATENT DOCUMENTS

| | | | |
|---|---|---|---|
| 5,375,018 A | 12/1994 | Klausner et al. | |
| 5,390,236 A | 2/1995 | Klausner et al. | |
| 5,487,167 A | 1/1996 | Dinallo et al. | |
| 5,524,140 A | 6/1996 | Klausner et al. | |
| 5,572,576 A | 11/1996 | Klausner et al. | |
| 5,692,213 A | 11/1997 | Goldberg et al. | |
| 5,734,963 A | 3/1998 | Fitzgerald et al. | |
| 5,737,011 A | 4/1998 | Lukacs | |
| 5,918,158 A | 6/1999 | LaPorta et al. | |
| 5,963,551 A | 10/1999 | Minko | |
| 5,970,122 A | 10/1999 | LaPorta et al. | |
| 6,037,932 A | 3/2000 | Feinleib | |
| 6,092,120 A | 7/2000 | Swaminathan et al. | |
| 6,104,757 A | 8/2000 | Rhee | |
| 6,175,619 B1 | 1/2001 | DeSimone | |
| 6,233,389 B1 | 5/2001 | Barton et al. | |
| 6,262,994 B1 | 7/2001 | Dirschedl et al. | |
| 6,378,035 B1 | 4/2002 | Parry et al. | |
| 6,480,783 B1 | 11/2002 | Myr | |
| 6,507,586 B1 | 1/2003 | Satran et al. | |
| 6,564,261 B1 | 5/2003 | Gudjonsson et al. | |
| 6,577,599 B1 | 6/2003 | Gupta et al. | |
| 6,580,694 B1 | 6/2003 | Baker | |
| 6,671,732 B1 | 12/2003 | Weiner | |
| 6,717,925 B1 | 4/2004 | Leppisaari et al. | |
| 6,721,703 B2 | 4/2004 | Jackson et al. | |
| 6,791,949 B1 | 9/2004 | Ryu et al. | |
| 6,807,565 B1 | 10/2004 | Dodrill et al. | |
| 6,807,578 B2 | 10/2004 | Satran et al. | |
| 6,829,473 B2 | 12/2004 | Raman et al. | |
| 6,834,039 B1 | 12/2004 | Kelly et al. | |
| 6,850,965 B2 | 2/2005 | Allen | |
| 6,912,544 B1 | 6/2005 | Weiner | |
| 6,931,114 B1 | 8/2005 | Martin | |
| 6,970,926 B1 | 11/2005 | Needham et al. | |
| 6,973,309 B1 | 12/2005 | Rygula et al. | |
| 6,993,009 B2 | 1/2006 | Kelly et al. | |
| 6,996,624 B1 | 2/2006 | LeCroy et al. | |
| 7,002,913 B2 | 2/2006 | Huang et al. | |
| 7,039,040 B1 | 5/2006 | Burg | |
| 7,039,675 B1 | 5/2006 | Kato | |
| 7,047,030 B2 | 5/2006 | Forsyth | |
| 7,058,392 B1 * | 6/2006 | Weinman, Jr. | 455/413 |
| 7,111,044 B2 | 9/2006 | Lee | |
| 7,117,521 B2 | 10/2006 | Puthiyedath | |
| 7,139,371 B2 | 11/2006 | McElvaney | |
| 7,171,491 B1 | 1/2007 | O'Toole et al. | |
| 7,187,941 B2 | 3/2007 | Siegel | |
| 7,218,709 B2 | 5/2007 | Garg et al. | |
| 7,233,589 B2 | 6/2007 | Tanigawa et al. | |
| 7,236,738 B2 | 6/2007 | Settle | |
| 7,240,105 B2 | 7/2007 | Satran et al. | |
| 7,283,809 B1 | 10/2007 | Weinman, Jr. | |
| 7,304,951 B2 | 12/2007 | Rhee | |
| 7,305,438 B2 | 12/2007 | Christensen et al. | |
| 7,313,593 B1 | 12/2007 | Pulito et al. | |
| 7,349,871 B2 | 3/2008 | Labrou et al. | |
| 7,382,881 B2 | 6/2008 | Uusitalo et al. | |
| 7,403,775 B2 | 7/2008 | Patel et al. | |
| 7,415,284 B2 | 8/2008 | Hoover et al. | |
| 7,626,951 B2 | 12/2009 | Croy et al. | |
| 7,787,879 B1 | 8/2010 | Philips et al. | |
| 7,991,419 B2 | 8/2011 | Matsumoto et al. | |
| 8,135,001 B1 | 3/2012 | Barreiro | |
| 8,140,100 B2 | 3/2012 | Wang | |
| 2001/0025377 A1 | 9/2001 | Hinderks | |
| 2002/0116465 A1 | 8/2002 | Kim et al. | |
| 2002/0128029 A1 | 9/2002 | Nishikawa et al. | |
| 2002/0150094 A1 | 10/2002 | Cheng et al. | |
| 2002/0154745 A1 | 10/2002 | Shtivelman | |
| 2002/0159600 A1 | 10/2002 | Weiner | |
| 2002/0184368 A1 | 12/2002 | Wang | |
| 2003/0027566 A1 | 2/2003 | Weiner | |
| 2003/0028632 A1 | 2/2003 | Davis | |
| 2003/0067542 A1 | 4/2003 | Monroe et al. | |
| 2003/0084106 A1 | 5/2003 | Erev et al. | |
| 2003/0099198 A1 | 5/2003 | Kiremidjian et al. | |
| 2003/0126162 A1 | 7/2003 | Yohe et al. | |
| 2003/0186722 A1 | 10/2003 | Weiner | |
| 2003/0190887 A1 | 10/2003 | Hook et al. | |
| 2004/0015547 A1 | 1/2004 | Griffin et al. | |
| 2004/0017905 A1 | 1/2004 | Warrier et al. | |
| 2004/0019539 A1 | 1/2004 | Raman et al. | |
| 2004/0045036 A1 | 3/2004 | Terasaki | |
| 2004/0074448 A1 | 4/2004 | Bunt | |
| 2004/0090959 A1 | 5/2004 | Cinghita et al. | |
| 2004/0095900 A1 | 5/2004 | Siegel | |
| 2004/0117722 A1 | 6/2004 | Harada | |
| 2004/0192259 A1 | 9/2004 | Xie | |
| 2004/0192353 A1 | 9/2004 | Mason et al. | |
| 2004/0192378 A1 | 9/2004 | Wulkan | |
| 2004/0229655 A1 | 11/2004 | Jang | |
| 2004/0252679 A1 | 12/2004 | Williams et al. | |
| 2004/0255148 A1 | 12/2004 | Monteiro et al. | |
| 2004/0258220 A1 | 12/2004 | Levine et al. | |
| 2005/0021819 A1 | 1/2005 | Kilkki | |
| 2005/0025308 A1 | 2/2005 | Tischer et al. | |
| 2005/0030932 A1 | 2/2005 | Kelly et al. | |
| 2005/0037706 A1 | 2/2005 | Settle | |
| 2005/0053033 A1 | 3/2005 | Kelly et al. | |
| 2005/0102358 A1 | 5/2005 | Gold et al. | |
| 2005/0135333 A1 | 6/2005 | Rojas | |
| 2005/0144247 A1 | 6/2005 | Christensen et al. | |
| 2005/0160345 A1 | 7/2005 | Walsh et al. | |
| 2005/0202807 A1 | 9/2005 | Ayyasamy | |
| 2005/0207487 A1 | 9/2005 | Monroe | |
| 2005/0215228 A1 | 9/2005 | Fostick et al. | |
| 2005/0220137 A1 | 10/2005 | Prigent et al. | |
| 2005/0259682 A1 | 11/2005 | Yosef et al. | |
| 2005/0288101 A1 | 12/2005 | Lockton et al. | |
| 2006/0007943 A1 | 1/2006 | Fellman | |
| 2006/0040683 A1 | 2/2006 | Lappalainen et al. | |
| 2006/0045038 A1 | 3/2006 | Kay et al. | |
| 2006/0047820 A1 * | 3/2006 | Sung et al. | 709/227 |
| 2006/0059267 A1 | 3/2006 | Cugi et al. | |
| 2006/0059342 A1 | 3/2006 | Medvinsky et al. | |
| 2006/0093304 A1 | 5/2006 | Battey et al. | |
| 2006/0107285 A1 | 5/2006 | Medvinsky | |
| 2006/0146822 A1 | 7/2006 | Kolakowski et al. | |
| 2006/0172754 A1 * | 8/2006 | Shin et al. | 455/518 |
| 2006/0187897 A1 | 8/2006 | Dabbs et al. | |
| 2006/0189305 A1 | 8/2006 | Ando et al. | |
| 2006/0212526 A1 | 9/2006 | Subramanian et al. | |
| 2006/0212582 A1 | 9/2006 | Gupta et al. | |
| 2006/0212592 A1 | 9/2006 | Gupta et al. | |
| 2006/0224748 A1 | 10/2006 | Gupta et al. | |
| 2006/0234743 A1 | 10/2006 | Fritsch et al. | |
| 2006/0244588 A1 | 11/2006 | Hannah et al. | |
| 2006/0245367 A1 | 11/2006 | Jeffery et al. | |
| 2006/0253599 A1 | 11/2006 | Monteiro et al. | |
| 2006/0268750 A1 | 11/2006 | Weiner | |
| 2006/0274698 A1 | 12/2006 | Twitchell | |
| 2006/0276714 A1 | 12/2006 | Holt et al. | |
| 2006/0282544 A1 | 12/2006 | Monteiro et al. | |
| 2006/0286968 A1 | 12/2006 | Klassen et al. | |
| 2006/0288391 A1 | 12/2006 | Puthiyedath | |
| 2006/0294259 A1 | 12/2006 | Matefi et al. | |
| 2007/0001869 A1 | 1/2007 | Hunzinger | |
| 2007/0021131 A1 | 1/2007 | Laumen et al. | |
| 2007/0180032 A1 | 8/2007 | Pearson | |
| 2007/0182819 A1 | 8/2007 | Monroe | |
| 2007/0184814 A1 | 8/2007 | Hamilton | |
| 2007/0207785 A1 | 9/2007 | Chatterjee et al. | |
| 2008/0000979 A1 | 1/2008 | Poisner | |
| 2008/0002621 A1 | 1/2008 | Ginzburg et al. | |
| 2008/0002691 A1 | 1/2008 | Qi et al. | |
| 2008/0020718 A1 | 1/2008 | Jin et al. | |
| 2008/0060027 A1 | 3/2008 | Yang | |
| 2008/0064373 A1 * | 3/2008 | Lessing | 455/413 |
| 2008/0086700 A1 | 4/2008 | Rodriguez et al. | |
| 2008/0090552 A1 | 4/2008 | Olsson et al. | |
| 2008/0095337 A1 | 4/2008 | Cai et al. | |
| 2008/0095338 A1 | 4/2008 | Cosky | |
| 2008/0114600 A1 | 5/2008 | Shaffer et al. | |

| | | | |
|---|---|---|---|
| 2008/0134054 | A1 | 6/2008 | Clark et al. |
| 2008/0205444 | A1 | 8/2008 | Campbell et al. |
| 2009/0063698 | A1 | 3/2009 | Xu et al. |
| 2009/0137216 | A1 | 5/2009 | Aoike et al. |
| 2009/0175425 | A1 | 7/2009 | Lee |
| 2009/0258608 | A1 | 10/2009 | Katis et al. |
| 2009/0259776 | A1 | 10/2009 | Katis et al. |
| 2010/0027766 | A1 | 2/2010 | Shin |

FOREIGN PATENT DOCUMENTS

| | | |
|---|---|---|
| JP | 2002-176510 | 6/2002 |
| WO | WO 03/073642 | 9/2003 |
| WO | WO2004/008336 | 1/2004 |
| WO | WO 2005/101697 | 10/2005 |
| WO | WO 2006/114673 | 11/2006 |
| WO | WO 2007/026320 | 3/2007 |

OTHER PUBLICATIONS

Apple Inc., "*iPhone User's Guide*," http://manuals.info.apple.com/en_13 US/iPhone_User_Guide.pdf, Downloaded on Oct. 3, 2008, 154 pages.

Brandx.net, "*Using Talk*," http://www.brandx.net/support/usingtelnet/talk.shtml, Downloaded on Sep. 19, 2008, 2 pages.

Businesswire.com "*LignUp 4.0 Delivers Industry's Most Comprehensive Suite of Communications Web Services*," http://www.businesswire.com/portal/site/google/index.jsp?ndmViewId=news_view&newsId=20070430005498&newsLang=en, Downloaded on Nov. 21, 2008, 10 pages.

Calore, Michael, "*SpinVox Moves Into VoIP, Brings Voice-to-Text to Skype Users*," Monkey_Bites, http://blog.wired.com/monkeybites/2007/08/spinvox-moves-i.html, Downloaded on Oct. 3, 2008, 4 pages.

Cardei et al., "*MAC Layer QoS Support for Wireless Networks of Unmanned Air Vehicles*," Proceedings of the 37th Hawaii International Conference on System Sciences—2004, Jan. 5-8, 2004 Page(s): 9 pp.

Charny, Ben, "*Nextel pushes new 'push to talk' features*," URL: http://news.zdnet.com/2100-9584_22-134945.html, Mar. 18, 2004, 3 pages.

Chen et al., "*An Adaptive Multimedia Transmission Protocol for Distributed Multimedia Applications*," Proceedings of the 5th International Workshop on Multimedia Network Systems and Applications (MNSA '2003), in conjunction with The 23rd International Conference on Distributed Computing Systems (ICDCS-2003), 6 pages.

Dannen, Chris, "*Technology: The Skype Mobile Phone Will Blow Your Mind*," Dec. 18, 2007, URL: http://www.fastcompany.com/blog/chris-dannen/lab/technology-skype-mobile-phone-will-blow-your-mind, 2 pages.

Erwu et al., "*Packet-late indication based (PLIB): adaptive jitter buffer*," ACM International Conference Proceeding Series; vol. 58, Proceedings of the winter international symposium on Information and communication technologies, Cancun, Mexico, SESSION: Performance, reliability, and quality of service, pp. 1-5 Year of Publication: 2004.

FAQS.org, "*RFC1644—T/TCP—TCP Extensions for Transactions Functional S*," http://www.faqs.org/rfcs/rfc1644.html, Downloaded on Sep. 19, 2008, 26 pages.

FluidVoice "Overview of FluidVoice," http://viral.media.mit.edu/wiki/tiki-index.php?page=FluidVoice, Downloaded on Sep. 16, 2008, 2 pages.

GrandCentral.com, "*Call Record*," http://www.grandcentral.com/howitworks/call_record, Downloaded on Sep. 26, 2008, 1 page.

GrandCentral.com, "*One Voicemail Box*," http://www.grandcentral.com/home/one_voicemail, Downloaded on Sep. 26, 2008, 1 page.

GrandCentral.com, "*So Many Features, You Won't Believe it*," http://www.grandcentral.com/support/howitworks/, Downloaded on Sep. 26, 2008, 1 page.

GrandCentral.com, "*Voicemail forwarding*," http://www.grandcentral.com/howitworks/voicemail_forwarding, Downloaded on Sep. 26, 2008, 1 page.

Henshall, Stuart, "*HotRecorder—Record Skype Calls*," Skype Journal, URL: http://skypejournal.com/blog/arehives/2005/03/hotrecorder_rec.php, Mar. 25, 2005, 11 pages.

IRCHelp.org, "*An IRC Tutorial*," http://www.irchelp.org/irchelp/irctutorial.html, Downloaded on Sep. 26, 2008, 14 pages.

Kadoink.com, "*Get a Widget*," http://www.kadoink.com/index.cfm?action=getWidgets, Downloaded on Sep. 19, 2008, 3 pages.

Krishnan et al., "*EVRC-Wideband: The New 3GPP2 Wideband Vocoder Standard*," IEEE International Conference on Acoustics, Speech and Signal Processing, 2007. ICASSP 2007, Publication Date: Apr. 15-20, 2007, vol. 2, on pp. II-333-II-336, Honolulu, HI.

Layton, Julia, "*How Slingbox Works*," Jan. 4, 2006, HowStuffWorks.com, http://electronics.howstuffworks.com/slingbox.htm, 9 pages.

LignUp.com, "*LignUp Communications Applications Server*," http://www.lignup.com/platform/index.html, Downloaded on Sep. 19, 2008, 1 page.

Network Dictionary, "*Instant Message (IM) Technology Overview*," http://www.networkdictionary.com/networking/im.php, Downloaded on Sep. 16, 2008, 2 pages.

Nikotalkie.com, "*Nikotalkie—Home*," http://www.nikotalkie.com/, Downloaded on Sep. 19, 2008, 2 pages.

Nikotel.com, "*Click-Pop-Talk WebStart Phone*," http://www.nikotel.com/nikotel-click-pop-talk-java-phone.html, Downloaded on Sep. 19, 2008, 1 page.

Notaras, George, "*dircproxy IRC Proxy*," http://www.g-loaded.eu/2007/02/01/dircproxy-irc-proxy/, Downloaded on Sep. 26, 2008, 4 pages.

Pash, Adam, "*Consolidate Your Phones with GrandCentral*," http://techgroup.groups.vox.com/library/post/6a00cd978d0ef7f9cc00e398b8ff7a0002.html, Downloaded on Sep. 19, 2008, 5 pages.

Patel, Nilay, "*Apple patent reveals data-to-voice translation system for cellphones*," Jul. 28, 2007, URL: http://www.engadget.com/2007/07/28/apple-patent-reveals-data-to-voice-translation-system-for-cellph/, 5 pages.

Piecuch et al., "*A Selective Retransmission Protocol for Multimedia on the Internet*," In Proceedings of SPIE Multimedia Systems and Applications, Nov. 2000, Boston MA, USA, 12 pages.

Qiao et al., "*SCTP Performance Issue on Path Delay Differential*," Lecture Notes in Computer Science, Springer Berlin / Heidelberg ISSN 0302-9743 (Print) 1611-3349 (Online) vol. 4517/2007, Wired/Wireless Internet Communications, pp. 43-54 Sunday, Jun. 24, 2007.

Ramo et al., "*On comparing speech quality of various narrow- and wideband speech codecs*," Proceedings of the Eighth International Symposium on Signal Processing and Its Applications, 2005. Publication Date: Aug. 28-31, 2005, vol. 2, on pp. 603-606.

Rey et al., "*I-D ACTION:draft-ietf-avt-rtp-retransmission-09.txt*," Aug. 5, 2003, http://osdir.com/ml/ietf.avt/2003-08/msg00003.html, Downloaded on Sep. 19, 2008, 2 pages.

Ribbit.com, "Amphibian," http://www.ribbit.com/everyday/, Downloaded on Sep. 26, 2007, 1 page.

Ribbit.com, "Enhanced Visual Voicemail," http://www.ribbit.com/everyday/tour/enhanced_visual_voicemail.php, Downloaded on Sep. 26, 2008, 2 pages.

Ribbit.com, "*What is Ribbit? Features*," http://www.ribbit.com/platform/features.php, Downloaded on Sep. 26, 2008, 1 page.

Ribbit.com, "*What is Ribbit? Overview*," http://www.ribbit.com/platform/index.php, Downloaded on Sep. 26, 2008, 1 page.

Ribbit.com, "*What is Ribbit? Voice Architecture*," http://www.ribbit.com/platform/architecture.php, Downloaded on Sep. 26, 2008, 2 pages.

Saito et al., "*IP Packet Loss Compensation Scheme with Bicast and Forwarding for Handover in Mobile Communications*," 2006 IEEE 17th International Symposium on Personal, Indoor and Mobile Radio Communications, Sep. 2006, pp. 1-5, Helsinki.

Skype.com, "*Making calls is just the start*," URL: http://www.skype.com/features/, Downloaded on Sep. 16, 2008, 2 pages.

Spinvox.com, "*Home Page*," http://www.spinvox.com/, Downloaded on Sep. 26, 2007, 3 pages.

Spinvox.com, "*How Does it Work?*," http://www.spinvox.com/how_it_works.html, Downloaded on Sep. 19, 2008, 2 pages.

Swissvoice.net, "*PSTN*," http://www.swissvoice.net/ww/htm_ww/08_technology/content_pstn.html, Downloaded on Sep. 19, 2008, 3 pages.

Tektronix, "*VOIP Technology Overview; Protocols, Convergence, Testing*," http://www.tektronics.com/voip, May 12, 2006.

The Jabber Extensible Communications Platform™, "*Products // Jabber XCP*," URL: http://www.jabber.com/CE/JabberXCP, Downloaded on Sep. 16, 2008, 2 pages.

ThunkDifferent.com, "*YouMail vs. Google Grandcentral Voice Mail Service*," http://thunkdifferent.com/2007/10/11/youmail-vs-google-grandcentral-voice-mail-service/, Downloaded on Oct. 3, 2008, 6 pages.

VOIP-News.com, "*Company Profile, LignUp*," http://www voip-news.com/vendors/lignup/, Downloaded on Dec. 5, 2008, 6 pages.

WikiBooks, "*Internet Technologies/IRC*," http://en.wikibooks.org/wiki/Internet_Technologies/IRC, Downloaded on Sep. 19, 2008, 4 pages.

WikiPedia—The Free Encyclopedia, "*E-mail*," http://en.wikipedia.org/wiki/E-mail, Downloaded on Sep. 19, 2008, 8 pages.

WikiPedia—The Free Encyclopedia, "*Internet Relay Chat*," http://en.wikipedia.org/wiki/Internet_Relay_Chat, Downloaded on Oct. 3, 2008, 11 pages.

WikiPedia—The Free Encyclopedia, "*Spinvox*," http://en.wikipedia.org/wiki/Spinvox, Downloaded on Sep. 26, 2008, 1 page.

WikiPedia—The Free Encyclopedia, "*TiVo*," http://en.wikipedia.org/wiki/TiVo, Downloaded on Sep. 16, 2008, 6 pages.

Yavuz et al., "*VoIP over cdma2000 1xEV-DO Revision A*," IEEE Communications Magazine, Feb. 2006, pp. 88-95.

HotRecorder.com, "*Features*," http://www.hotrecorder.com/music_features.asp, downloaded on Sep. 26, 2008, 1 page.

HotRecorder.com, "*Help*," http://www.hotrecorder.com/music_help.asp, downloaded on Sep. 26, 2008, 3 pages.

HotRecorder.com, "*FAQs*," http://www.hotrecorder.com/music_support.asp, downloaded on Sep. 26, 2008, 1 page.

WikiPedia—The Free Encyclopedia, "*Skype*," http://en.wikipedia.org/wiki/Skype, Downloaded on Sep. 26, 2008, 7 pages.

WikiPedia—The Free Encyclopedia, "*Skype Protocol*," http://en.wikipedia.org/wiki/Skype, Downloaded on Sep. 26, 2008, 4 pages.

Jabber.org, "*Main page*," http://www.jabber.org/web/main_page, Sep. 2, 2008, downloaded on Sep. 26, 2008, 1 page.

Jabber.org, "*FAQ*," http://www.jabber.org/web/faq, Sep. 4, 2008, downloaded on Sep. 26, 2008, 2 pages.

Apple Inc., "*iPhone: About Visual Voicemail*," http://www.support.apple.com/kb/HT.1486, Downloaded on Sep. 26, 2008, 3 pages.

Jabber.org, "*Products // Jabber XCP // Benefits*," http://www.jabber.com/CE/JabberXCPBenefits, downloaded on Sep. 26, 2008, 1 page.

Jabber.org, "*Products // Jabber Clients*," http://www.jabber.com/CE/JabberClients, downloaded on Sep. 26, 2008, 1 page.

Jabber.org, "*Products // JabberNow*" http://www.jabber.com/CE/JabberNow, downloaded on Sep. 26, 2008, 1 page.

KillerStartups.com, "Kadoink—Mobilizing your Socializing," http://www.killerstartups.com/Web20/kadoink-com-moblizing-your-socializing, Downloaded on Sep. 26, 2008, 3 pages.

CNETNews.com, "*Kadoink's phonecast lines officially open for texting*," http://news.cnet.com/8301-17939_109-9829877-2.html, downloaded on Sep. 26, 2008, 1 page.

BusinessWire.com, "*LignUp 4.0 Delivers Industry's Most Comprehensive Suite of Communications Web Services*," Apr. 30, 2007, http://www.businesswire.com/portal/site/google/?ndmViewId=newsview&newsId=20070430005498&newsLang=en, Downloaded on Sep. 26, 2008, 6 pages.

VOIP-News.com, "*Company Profile—LignUp*," http://www.voip-news.com/vendors/lignup/, Downloaded on Oct. 3, 2008, 6 pages.

JustAnotheriPhoneBlog.com, "*Nikotalkie—Just Talk, Don't Type*," http://justanotheriphoneblog.com/wordpress/2007/10/13/nikotalkie-just-talk-dont-type/, Downloaded on Sep. 26, 2008, 10 pages.

WikiPedia—The Free Encyclopedia, "*Push to Talk*" http://en.wikipedia.org/wiki/Push_to_talk, Downloaded on Sep. 26, 2008, 3 pages.

WikiPedia—The Free Encyclopedia, "*Slingbox*" http://en.wikipedia.org/wiki/Slingbox, Downloaded on Sep. 26, 2008, 4 pages.

About.com, "*Linux / Unix Command: talk*,"http://linux.about.com/od/commands/l/b1cmdll_talk.htm, Downloaded on Sep. 26, 2008, 2 pages.

Fall, Kevin, "*A Delay-Tolerant Network Architecture for Challenged Internets*," Feb. 2003, http://www.dtnrg.org/docs/papers/IRB-TR-03-003.pdf, 15 pages.

Chuah et al., "*Store-and-Forward Performance in a DTN*," Vehicular Technology Conference, 2006. VTC 2006-Spring. IEEE 63$^{rd}$, Publication Date: May 7-10, 2006, vol. 1, on pp. 187-191.

Krishnan, et al., "*The SPINDLE Disruption-Tolerant Networking System*," Military Communications Conference, 2007. MILCOME 2007. IEEE Volume, Issue, Oct. 29-31, 2007 pp. 1-7.

WikiPedia—The Free Encyclopedia, "*Visual Voicemail*" http://en.wikipedia.org/wiki/Visual_voicemail, downloaded on Sep. 26, 2008, 1 page.

Amir et al., "*An Overlay Architecture for High Quality VoIP Streams*,", IEEE Transactions on Multimedia, Publication Date: Dec. 2006, vol. 8, Issue:6, on pp. 1250-1262.

Rothermel et al., "*An Adaptive Stream Synchronization Protocol*," Lecture Notes in Computer Science; vol. 1018, Proceedings of the 5th International Workshop on Network and Operating System Support for Digital Audio and Video, pp. 178-189, Year of Publication: 1995.

Baset et al., "*An Analysis of the Skype Peer-to-Peer Internet Telephony Protocol*," INFOCOM 2006. 25th IEEE International Conference on Computer Communications. Proceedings (2006), pp. 1-11.

Cerf et al., "*A Protocol for Packet Network Intercommunication*," Communications, IEEE Transactions on, vol. 22, Issue 5, May 1974 pp. 637-648.

WikiPedia—The Free Encyclopedia, "Eudora (email client)," http://en.wikipedia.org/wiki/Eudora_(e-mail_client), Downloaded on Sep. 20, 2008, 3 pages.

"Eudora," Answers.com, http://www.answers.com/topic/eudora-e-mail-client, Downloaded on Aug. 20, 2009, 4 pages.

"The Eudora Open Messaging Advantage," Qualcomm, 1997, Part No. 100-50030-1, 23 pages.

"Aspera—Next Generation File Transport—Broadcasting & Entertainment Media," Asperasoft.com, http://www.asperasoft.com/en/industries/digital_media_10/Broadcast_Entertainment_Media_5, Downloaded on Sep. 22, 2009, 2 pages.

"Aspera—Next Generation File Transport—fasp™ transfer times," Asperasoft.com, http://www.asperasoft.com/en/technology/fasp_transfer_times_14/fasp_transfer_times_14, Downloaded on Sep. 22, 2009, 1 page.

"Aspera—Next Generation File Transport—the fasp solution," Asperasoft.com, http://www.asperasoft.com/en/technology/fasp_solution_3/the_fasp_solution_3, Downloaded on Sep. 22, 2009, 3 pages.

"Aspera—Next Generation File Transport—the shortcomings of TCP file transfer," Asperasoft.com, http://www.asperasoft.com/en/technology/shortcomings_of_TCP_2/the_shortcomings_of_TCP_file_transfer_2, Downloaded on Sep. 22, 2009, 2 pages.

"Aspera—Next Generation File Transport—fasp technology overview" Asperasoft.com, http://www.asperasoft.com/en/technology/fasp_overview_1/fasp_technology_overview_1, Downloaded on Sep. 22, 2009, 2 pages.

"Aspera fasp™ High Speed Transport—A Critical Technology Comparison," White Paper, Asperasoft.com, http://www.asperasoft.com/en/technology/white_papers_13/aspera_fasp_high_speed_transport_13, Downloaded on Sep. 22, 2009, 11 pages.

"Palringo Brings First Push-to-Talk Application to the iPhone," RedOrbit.com, http://www.redorbit.com/news/technology/1525545/palringo_brings_first_pushtotalk_application_to_the_iphone/index.html, Downloaded on Aug. 13, 2009, 2 pages.

Palringo—Features, Palringo.com, http://www.palringo.com/en/gb/features/, Downloaded on Aug. 13, 2009, 1 page.

Moren, Dan, "Palringo Brings Picture Messaging to Iphone," http://www.pcworld.com/article/149108/palringo_brings_picture_messaging_to_iphone.html, Downloaded on Aug. 13, 2009, 3 pages.

Paul, Ryan, "Gmail gets Google Talk integration," Arstechnica.com, http://arstechnica.com/old/content/2006/02/6128.ars, Downloaded on Aug. 20, 2009, 1 page.

Sherman, Chris, "Google Integrates Chat with Gmail," Search Engine Watch, http://searchenginewatch.com/3583121, Feb. 7, 2006, Downloaded on Aug. 20, 2009, 2 pages.

"About Gmail," http://mail.google.com/mail/help/chat.html, Downloaded on Aug. 20, 2009, 3 pages.

WikiPedia—The Free Encyclopedia, "Google Talk," http://en.wikipedia.org/wiki/Google_Talk, Downloaded on Aug. 20, 2009, 8 pages.

Azuri, Calvin, "Palringo Gold Launched on BlackBerry Smartphone", Apr. 20, 2009, http://ivr.tmcnet.com/topics/ivr-voicexml/articles/54573-palringo-gold-launched-blackberry-smartphone.htm, Downloaded on Aug. 13, 2009, 3 pages.

Liaw, Kim Poh, "Palringo launches its IM Software for Android Phones," Slashphone.com, Mar. 24, 2009, http://www.slashphone.com/palringo-launches-its-im-software-for-android-phones-245111, Downloaded on Aug. 13, 2009, 8 pages.

WikiPedia—The Free Encyclopedia, "Palringo" http://en.wikipedia.org/wiki/Palringo, Downloaded on Aug. 13, 2009, 1 page.

International Search Report from PCT/US2009/037966, mailed Jun. 25, 2009.

Written Opinion from PCT/US2009/037966, mailed Jun. 25, 2009.

Office Action from U.S. Appl. No. 12/336,232 dated Oct. 6, 2011.
Office Action from U.S. Appl. No. 12/336,232 dated Mar. 26, 2012.
Office Action from U.S. Appl. No. 12/336,232 dated Aug. 1, 2012.
Office Action from U.S. Appl. No. 12/336,232 dated Oct. 24, 2012.
Office Action from U.S. Appl. No. 12/336,206 dated Oct. 6, 2011.
Office Action from U.S. Appl. No. 12/336,206 dated Mar. 26, 2012.
Office Action from U.S. Appl. No. 12/336,206 dated Aug. 1, 2012.
Office Action from U.S. Appl. No. 12/336,206 dated Nov. 7, 2012.

* cited by examiner

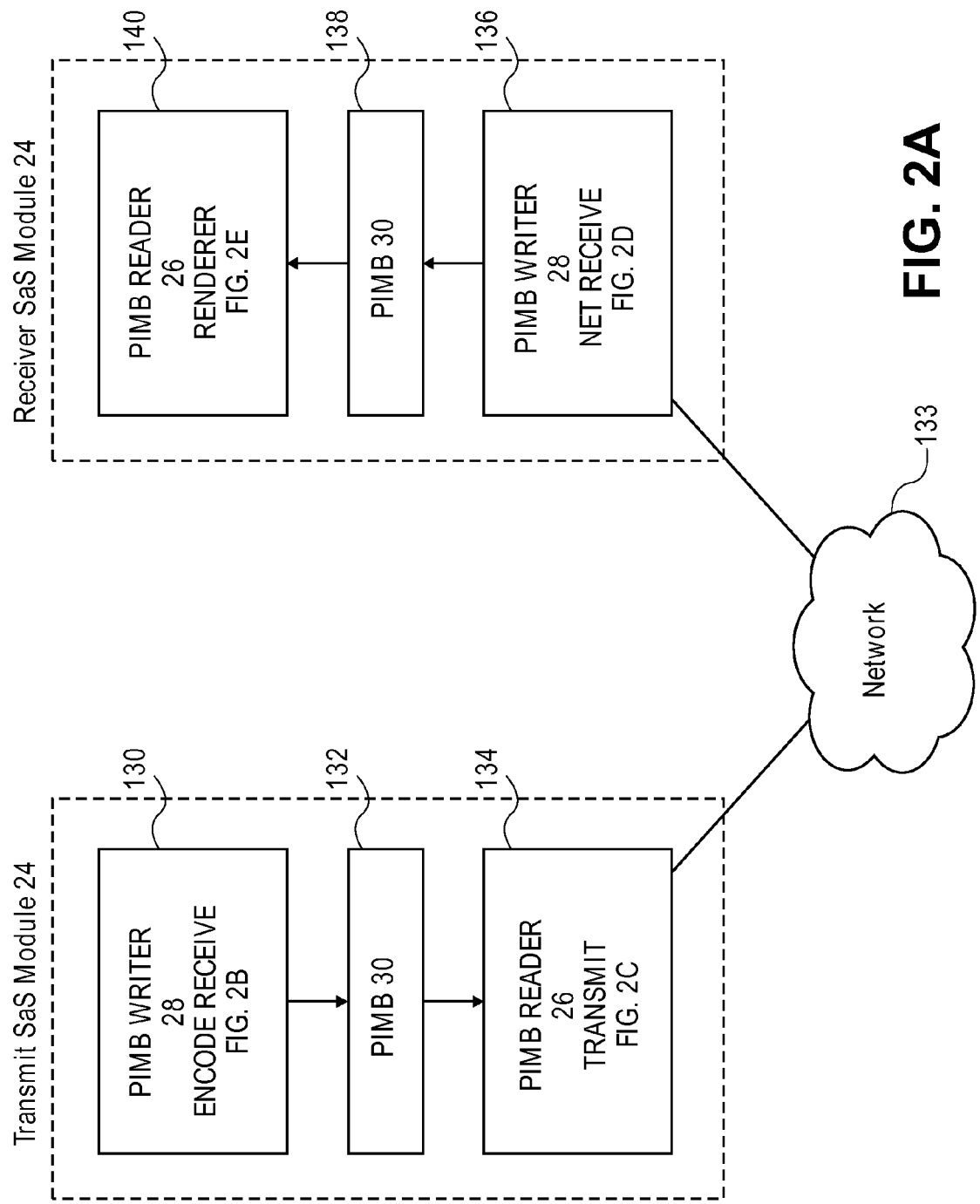

TIME-SHIFTING FOR PUSH TO TALK VOICE COMMUNICATION SYSTEMS

CROSS-REFERENCE TO RELATED APPLICATIONS

This application is a continuation of pending U.S. application Ser. No. 12/336,206, filed Dec. 16, 2008, and entitled "Time-Shifting For Push To Talk Voice Communication Systems." U.S. application Ser. No. 12/336,206 claims the benefit of priority to U.S. Provisional Patent Application No. 61/044,272 filed Apr. 11, 2008, entitled "Time-Shifting for Voice Communications." All of the foregoing applications are incorporated herein by reference in their entirety for all purposes.

BACKGROUND

1. Field of the Invention

The present invention relates to telecommunications, and more particularly, to an apparatus for applying time-shifting functionality to voice communications.

2. Description of Related Art

Voice communication systems consist of one of more "channels." In the case of Push To Talk (PTT) systems, such as tactical radios or PTT over Cellular (PoC), only a single channel is used whenever someone is transmitting. A user cannot transmit while their device is receiving. These systems are said to be "half-duplex". The alternative is "full-duplex" systems like landline telephones, cellular telephones, or VoIP systems such as Skype or SIP. Each of these full-duplex systems uses two channels, one for voice being received and the other for voice being transmitted. User communication devices generally "connect" these channels, either to a speaker, a microphone, or both, depending on the duplex and current mode of operation.

Many full-duplex telephony systems have some sort of message recording facility for unanswered calls such as voicemail. If an incoming call goes unanswered, it is redirected to a voicemail system. When the caller finishes the message, the recipient is alerted and may listen to the message. Various options exist for message delivery beyond dialing into the voicemail system, such as email or "visual voicemail", but these delivery schemes all require the entire message to be left before the recipient can listen to the message.

Many home telephones have answering machine systems that record missed calls. They differ from voicemail in that the caller's voice is often played through a speaker on the answering machine while the message is being recorded. The called party can pick up the phone while the caller is leaving a message. If this occurs with most answering machines, the recording of the message stops while the parties engage in a telephone conversation. With other answering machines, however, the live conversation will be recorded unless the called party manually stops the recording. In either recording situation, there is no way for the called party to review the recorded message until after the recording has stopped. There is no way for the recipient to review any portion of the recorded message other than the current point of the conversation while the conversation is ongoing and is being recorded. Only after the conversation has concluded and the parties have hung up or the recipient has manually stopped the recording can the recipient go back and review the recorded message or conversation.

Some more recent call management systems provide a "virtual answering machine", allowing callers to leave a message in a voicemail system, while giving called users the ability to hear the message as it is being left. The actual answering "machine" is typically a voicemail-style server, operated by the telephony service provider. Virtual answering machine systems differ from standard voice mail systems in that the called party may use either their phone or a computer to listen to messages as they are being left. Similar to an answering machine as described in the preceding paragraph, however, the called party can only listen at the current point of the message as it is being left. There is not way to review previous portions of the message before the message is left in its entirety and the caller hangs up.

Certain mobile phone handsets have been equipped with an "answering machine" feature inside the handset itself and that behaves similarly to a landline answering machine as described above. With these answering machines, callers may leave a voice message, which is recorded directly on the phone of the recipient. While the answering machine functionality has been integrated into the phone, all of the limitations of answering machines, as discussed above, are still present.

With current PTT systems, incoming audio is played on the device as it is received. If the user does not hear the message, for whatever reason, the message is irretrievably lost. Either the sender must resend the message or the recipient must request the sender to re-transmit message. PTT systems generally do not have any sort of "missed message" recording capability.

Other forms of PTT messaging systems exist that are purely message based and are never live. See for example U.S. Pat. No. 7,403,775 and U.S. Publications 2005/0221819 and 2005/0202807.

A problem with all the above-mentioned systems is that there is no way for: (i) a recipient of a message to review the message while it is being left; (ii) review received messages at an arbitrary time after receipt in a time-shifted or messaging mode; or (iii) seamlessly transition the exchange of messages between a sender and a recipient between the time-shifted mode and a real-time mode.

SUMMARY OF THE INVENTION

A network communication device located on a Push To Talk (PTT) communication network and configured to provide time-shifting capabilities to a user of a PTT communication device. The network communication device includes a receiver configured to progressively receive time-based media. The network communication device also includes a time-shifting buffer for progressively storing the received time based media as the time-based media is received and a time-shifting buffer controller configured to control the rendering of the time-based media at the PTT device. In response to a control signal received from the PTT device of the user, the time-based media is rendered at the PTT communication device either (i) in a near real-time mode as the time-based media is progressively received at the network communication device and progressively transmitted to the PTT device or (ii) at an arbitrary later time after the storage of the time-based media in the time-shifting buffer by retrieving the time-based media from the time-shifting buffer at the arbitrary later time and transmitting the retrieved time-based media to the PTT communication device. In various embodiments, the user of the PTT device is provided a number of rendering options, including play the time-based media, pausing the time-based media as it is being rendered, jump backward to review previous time-based media, jump to the most current time-based media, play the time-based media either faster or slower than it was originally encoded and catch up to live.

BRIEF DESCRIPTION OF THE DRAWINGS

The invention may best be understood by reference to the following description taken in conjunction with the accompanying drawings, which illustrate specific embodiments of the present invention.

FIGS. 2A through 2E are a series of flow diagrams illustrating a store and stream function of the communication and management system of the invention.

It should be noted that like reference numbers refer to like elements in the figures.

DETAILED DESCRIPTION OF SPECIFIC EMBODIMENTS

Figure 1:
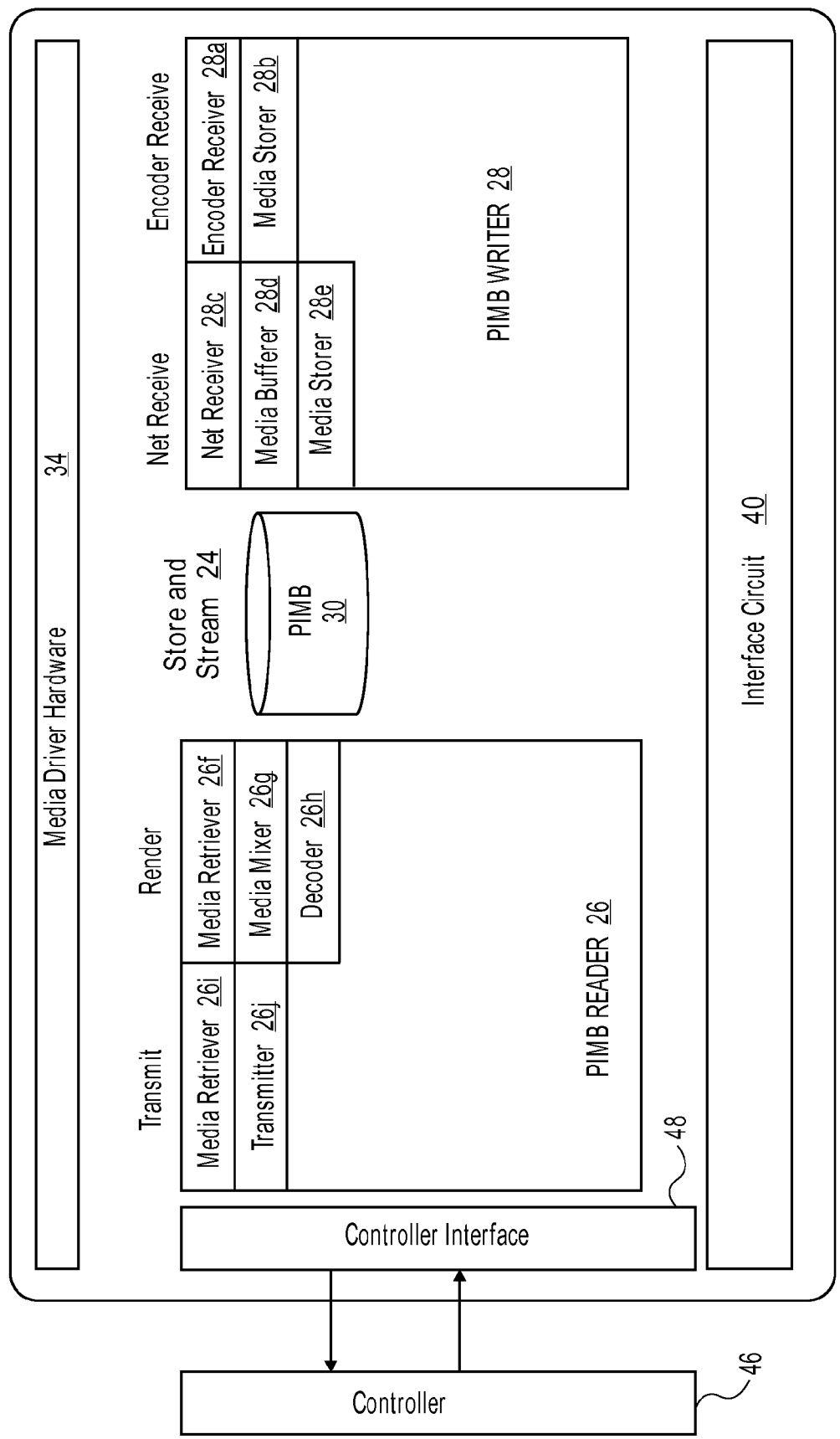
FIG. 1 illustrates a block diagram of a Store and Stream (SaS) module (i.e., a time-shifting buffer) of the present invention.

The present invention will now be described in detail with reference to various embodiments thereof as illustrated in the accompanying drawings. In the following description, specific details are set forth in order to provide a thorough understanding of the present invention. It will be apparent, however, to one skilled in the art, that the present invention may be practiced without using some of the implementation details set forth herein. It should also be understood that well known operations have not been described in detail in order to not unnecessarily obscure the present invention.

In U.S. application Ser. No. 12/028,400, filed on Feb. 8, 2008 and entitled "Telecommunication and Multimedia Management Method and Apparatus," an improved voice and other media communication and management system and method is disclosed. The system and method provides one or more of the following features and functions: (i) enabling users to participate in multiple conversation types, including live phone calls, conference calls, voice messaging, consecutive or simultaneous communications; (ii) enabling users to review the messages of conversations in either a live mode or a time-shifted mode (voice messaging); (iii) enabling users to seamlessly transition a conversation between a synchronous "live" mode and a time shifted mode; (iv) enabling users to participate in conversations without waiting for a connection to be established with another participant or the network. This attribute allows users to begin conversations, participate in conversations, and review previously received time-shifted messages of conversations even when there is no network available, when the network is of poor quality, or other participants are unavailable; (v) enabling the system to save media payload data at the sender and, after network transmission, saving the media payload data at all receivers; (vi) enabling the system to organize messages by threading them sequentially into semantically meaningful conversations in which each message can be identified and tied to a given participant in a given conversation; (vii) enabling users to manage each conversation with a set of user controlled functions, such as reviewing "live", pausing or time shifting the conversation until it is convenient to review, replaying in a variety of modes (e.g., playing faster, catching up to live, jump to the head of the conversation) and methods for managing conversations (archiving, tagging, searching, and retrieving from archives); (viii) enabling the system to manage and share presence data with all conversation participants, including online status, intentions with respect to reviewing any given message in either the live or time-shifted mode, current attention to messages, rendering methods, and network conditions between the sender and receiver; (iix) enabling users to manage multiple conversations at the same time, where either (a) one conversation is current and all others are paused; (b) multiple conversations are rendered consecutively, such as but not limited to tactical communications; or (c) multiple conversations are active and simultaneously rendered, such as in a stock exchange or trading floor environment; (ix) enabling users to store all conversations, and if desired, persistently archive them in a tangible medium, providing an asset that can be organized indexed, searched, transcribed, translated and/or reviewed as needed; (x) enabling the system to provide real time call functionality using a best-efforts mode of message delivery at a rate "good enough" for rendering as soon as possible (similar to UDP), and the guaranteed eventual delivery of exact copies of the messages as transmitted by requesting retransmission of any missing or defective data from the originally saved perfect copy (similar to TCP); and (xi) enabling the system to optimize the utilization of network bandwidth by making tradeoffs between timeliness and media quality, using the presence and intentions of the recipient(s) (i.e., to either review the media in real-time or in a time-shifted mode), as well as measures of network latency, network degradation, packet loss or damage, and/or current bandwidth conditions. For more details on the Telecommunication and Multimedia Management Method and Apparatus, see the above-mentioned U.S. application Ser. No. 12/028,400, incorporated by reference herein for all purposes.

One of the main components in the aforementioned system is a Store and Stream (SaS) module. Wit the present invention, one or more SaS module(s) may be provided on end-user communication devices and/or at various nodes or hops on a circuit-based network, such as the Public Switched Telephone Network (PSTN), analog voice networks, cellular networks, Push To Talk (PTT) networks, or any other circuit type based network. One or more SaS module(s) may also be provided on end-user devices and/or nodes of a packet-based network or a VoIP network or other network system designed to replicate the functionality of telephone or PTT radio systems using packets. It should be understood that the term "network" should therefore be broadly construed to include any circuit-based or packet based network and should not be construed as limiting in any way.

Time-based media is any media that changes meaningfully with respect to time. Voice or video clips are both considered time-based media because they both substantively change as time passes. By way of comparison, a still photo is generally not considered time-based media because it is static and does not change with the passage of time.

In embodiments where the SaS module is embedded in an end-user communication device, such as a mobile or cellular phone, handset, radio, PTT communication device, etc., the SaS module acts as a time-shifting buffer between the existing audio/voice hardware on the device (i.e., a microphone or speaker) and the transmitting and receiving hardware on the device, such as a radio transceiver. Any media either generated at or received at the end-user device is stored in a time-based format in the time-shifting buffer in a time-based format.

In embodiments where the SaS module is deployed on a server on the network, in what is hereafter referred to as a network communication device, then the time-shifting buffer functionality is located on the network, between the transmitting and receiving end-user communication devices. Transmissions between the two communication devices are stored in a time-based format in the time-shifting buffer on the network.

In yet other embodiments, SaS modules may be provided at both end user communication devices and on the network in one or more network communication devices. With this arrangement, the transmissions are stored both on the SaS enabled end user devices and on the one or more network communication devices on the network.

The Store and Stream module persistently stores time-based media in the time-based format as the media is received. With embodiments where the SaS module is located on a network communication device, the time-based media is stored as it is received from one or more end-user communication devices as the one or more end-user communication devices send transmissions back and forth over the network. With embodiments where the SaS module is on the end-user communication device itself, the received media that is stored includes both time-based media created by or otherwise originating at the end-user communication device itself and time-based media received over the network from others who have sent messages.

With standard full-duplex telephone calls, regardless if over legacy phone systems, cellular, wireless, or VoIP, a number of new functions are provided by the storage of voice as time-based media in the SaS module. Foremost, a user may participate in an ongoing exchange of messages in either (i) a "live" near real-time mode, similar to a conventional phone call where spoken words are sent back and forth between the participants, (ii) a time-shifted mode, where the user hears a message at some point "behind" the live point, along with the ability to catch up to the live point by playing the intervening message or messages faster or directly skipping over messages to arrive at the live point; or (iii) seamlessly transition between the real-time mode and the time-shifted mode.

If an incoming message is missed, the SaS module records the message from the sender. By default, missed messages would be in a time-shifted state. As missed messages are received, they are queued in storage for later review by the recipient. Alternatively, if a called party is present when a message is received, the called party may chose to engage in the conversation in the real-time mode or review the message at an arbitrary time later in the time-shifted mode. In addition, since the message is being recorded in the SaS module, the recipient also has the option of reviewing any portion of the message as it is being received with a number of playback controls, described in more detail below.

Storing the media at the SaS module provides a number of functions previously not available on communication systems: (i) it enables users to leave a message for another party, even when the sender and/or the recipient has poorly functioning or otherwise unavailable network connectivity; (ii) the recipient has the ability to pause, replay, fast-forward, and catch-up-to-live with an ongoing exchange of messages between two or more parties such as during a conversation; (iii) the ability to retrieve and review previously sent, stored and archived messages; (iii) locally generated messages can be mixed as appropriate to create overlapping messages (generated by the normal overlap of multiple speakers during a conversation); (iv) enables the transcription or translation of voice media into either text or other languages; and (v) it enables users with several rendering options, including reviewing messages faster or slower, for example.

When listening to messages at some time after the messages have been received in the time-shifted mode, the SaS module provides the user with the ability to speed up the review of the recorded messages at a rendering rate faster than the rate the messages were originally encoded. This allows for more rapid reviewing of older content and also allows users to "catch up" to the live point of a conversation, seamlessly transitioning from the review of previously received and stored media of the conversation with new media as it is being received, hereafter referred to as "catch-up-to-live".

With half-duplex or Push-To-Talk (PTT) systems, either on a tactical radio style device or using PTT over Cellular, the SaS module provides new functionality, including the ability to communicate in either the real-time mode or time-shifted mode, and the ability to seamlessly transition between the two modes, similar to that described above with regard to full duplex communication systems. In addition, PTT users will have the ability to skip forward and backward on a per-message basis. For each message, the user has the option of implementing all the above-listed playback features (e.g., play faster, play slower, catch up to live, etc.). With a SaS module equipped PTT system, incoming messages may optionally be played as they are being received. All received messages, however, are stored for review at an arbitrary later time defined by the recipient. If a user is reviewing an old message while a new message is received, an indication may be provided. Users have the option of reviewing other messages simultaneously with the arrival of new messages or serializing the review of incoming messages. Users can also replay messages that were missed without asking the sending party to retransmit. Further, the SaS module enables a PTT user to set a "do not disturb" mode of interaction where incoming transmissions that are recorded and queued for recipient are not played through the speaker. The time-indexing, recording, and the rendering of messages in the time-shifted mode can also apply to any locally generated transmissions. In this manner, a PTT user can review their message contributions, in addition to any received messages, of an ongoing conversation.

With a SaS module embedded in the device of a sending user, the delay imposed on the user by the network for call setup and "volley" times are reduced. A sending user may begin speaking immediately while the SaS module time-indexes and stores the message as time-based media. As the storage is occurring, the sending device carries out the usual network negotiation and setup processes. When a circuit or network connection is established, the SaS module will send the message from storage starting from the beginning of the message. The typical sequence of a caller waiting for a connection to be established and the phone to ring before speaking is thus eliminated.

Referring to FIG. 1, a block diagram of the SaS module 24 according to one embodiment of the present invention is shown. The main function of the SaS module 24 is that it acts as a time-shifting buffer for communication devices connected to circuit-based or packet based networks that replicate the functionality of telephone or PTT radio systems such as VoIP. The components of the SaS module 24 are described in detail below. It should be noted that in the embodiment illustrated in FIG. 1, the SaS module 24 is intended for use in an end-user communication device. In embodiments where the SaS module is located at a node on the network in a network communication device, some of the functionality illustrated in FIG. 1 is not required, as pointed out in the discussion below.

The Persistent Infinite Message Buffer (PIMB)

The Persistent Infinite Message Buffer or PIMB 30 stores or records time-based media in a time-indexed format and provides a system for the retrieval of the media. In one embodiment, the media in the PIMB 30 is arbitrarily persistent, meaning it is available virtually forever or at least until it is purposely deleted or deleted in accordance with a pre-defined retention policy. This persistence is in comparison to existing jitter buffer technology that discards media as soon as it is rendered. Various retention rates and strategies may be employed to make effective use of storage resources. Many possible implementations exist for the physical storage implementation of the PIMB 30, including, but not limited to: ROM, RAM, volatile memory, non-volatile memory, Flash memory, hard drives, optical media, or some combination thereof. In one specific embodiment, the PIMB 30 may be implemented using a small and relatively fast RAM cache memory coupled with a hard drive for persistent storage. The PIMB 30 is also "infinite in size, meaning the amount of media that can be stored is not inherently limited. As the physical storage capacity of the PIMB 30 is exceeded, the media is maintained in secondary or archival storage for later retrieval.

In various embodiments, the archival storage may be either local or remote. In embodiments where the SaS module 24 is a node on a network, the archival storage may be located at the same node or at another node on the network. In embodiments where the SaS module 24 is located on a end-user communication device, the archival storage may be either local at the device or at a remote location accessible over the network. A predefined criteria or a replacement algorithm, such as least-recently-used, or first-in-last-out, is used to control the actual media stored in the PIMB 30 or archived at any point in time. The PIMB 30 further provides the attributes of file system storage and the random access attributes of a database. Any number of conversations or messages, regardless of their duration, may be stored and later retrieved for review.

In addition, the meta-data associated with messages, such as its originator and its length, may be also stored in the PIMB 30. In alternative embodiments, the media and other data can be stored for a designated period of time (e.g. 30 days). Once the age of the media exceeds the designated period, the media is discarded. In another embodiment, media may be discarded based on the sender and/or the recipient of the message, or the topic of the message. In yet other embodiments, certain media may be marked for transience, meaning the messages will not be stored in the PIMB 30 beyond the requirements for immediate rendering.

The PIMB Writer

The PIMB writer 28 writes data to the PIMB 30 for two basic purposes. The PIMB writer 28 writes media into the PIMB 30 derived from media received from a media-capturing device, such as a microphone or video camera ("Encode Receive"). The PIMB writer 28 also writes media contained in messages received over the network from others into the PIMB 30 ("Net Receive"). The Encode Receive and Net Receive functions are described in more detail below.

1. Encode Receive

For capturing locally generated media, the PIMB writer 28 includes Encoder Receiver 28a and a Media Storer 28b.

When a User speaks into the microphone for example, the hardware 34 receives the raw audio signals and provides them to the Encoder Receiver 28a, which encodes the voice into electrical signals, for example in digital form. The Media Store 28b time-indexes the digital signals and stores the signals as time-based media in the PIMB 30. Other types of time-based media, such as video, is processed and stored in a similar manner. The Encode Receive function is typically implemented only on an end user communication device. In embodiments where the SaS module 24 is located on the network, the Encode Receive functionality may not be needed or implemented.

2. Net Receive

For storing the media of messages received over the network into the PIMB 30, the Net Receive function of PIMB writer 28 includes a Network Receiver 28c, a Media Bufferer 28d, and a Media Storer 28e. The Network Receiver 28c receives the time-based media of messages over the network. The Media Bufferer 28d buffers the incoming signals as necessary. The Media Storer 28e time-indexes and stores the time-based media in the PIMB 30. The Net Receive function would typically be implemented in a SaS module 24 located on both an end-user communication device and in a network communication device located at a node on the network.

The PIMB Reader

The PIMB reader 26 reads data from the PIMB 30 for two basic purposes. The PIMB reader 26 accesses the PIMB 30 when a message is to be rendered ("Render") for the user. Data is also read from the PIMB 30 when media is to be transmitted ("Transmit") over the network. The Render and Transmit functions are described below.

1. Render

For the rendering of messages, the PIMB reader 26 includes a Media Retriever 26f, a Media Mixer 26g and a Media Decoder 26h. The Media Retriever 26f retrieves the media selected for rendering from the PIMB 30. If the selected media of two or more messages overlap by time-index, the Mixer 26g mixes the overlapping retrieved media. The Media Decoder 26h decodes or converts the media (in either mixed or non-mixed form) into signals in a form suitable for the hardware driver 34. The hardware 34 then drives a speaker or video display, creating audio and/or video signals. The Render function is typically implemented only on an end user communication device. In embodiments where the SaS module 24 is located on the network in a network communication device, the Render functionality may not be needed or implemented.

2. Transmit

To transmit messages over the network, the PIMB Reader 26 includes a Media Retriever 26i, and a Transmitter 26j. The Retriever 26i selects the media from the PIMB 30 for transmission and the Transmitter 26j transmits the selected media. Where the SaS module 24 is located on an end-user communication device, the selected media may be either media previously stored in the PIMB 30 or media that is currently being created locally for transmission to a recipient over the network. In various embodiments, the currently created media may be stored in the PIMB either (i) just before transmission; (ii) just after transmission, or (iii) or at substantially the same as the media is transmitted. With all three embodiments, any delays associated with storage and transmission are sufficiently small so that the recipient may perceive a "live" experience if rendering the media in the near real-time mode.

With embodiment where the SaS module 24 is located on a network communication device on the network, the media selected for transmission is media that was either previously stored in the PIMB 30 or media that is being progressively received from a sender for transmission to a recipient. With the former, the media is typically being retrieved from the PIMB 30 when the recipient wishes to review a previously received and stored message in the time-shifted mode. With the latter, the recipient is reviewing the transmission in the real-time mode, meaning the network communication device is progressively receiving, progressively storing in the time-indexed format in the PIMB 30, and progressively transmitting the message to the recipient as the media is being received.

Interface Circuit

The interface circuit 40 is responsible for providing an interface between the SaS module 24 and the underlying application module of an end-user communication device. For example, with a VoIP client communication device, the interface circuit 40 provides the interface between the SaS module 24 and the underlying VoIP application of the device. For a PTT radio, the interface circuit 40 provides the interface between the SaS module 24 and the PTT radio application module on the device. With a mobile phone with PTT capabilities over cellular or a standard legacy telephone phone, the interface circuit provides an interface between the PTT and underlying cellular radio module or standard telephone module of the devices respectively. In each case, the underlying application module is the hardware and/or software responsible for implementing the VoIP, PPT, and legacy phone functionality of the end-user communication device. A network communication device with an SaS module 24 would typically not include an interface circuit 40, unless the network communication device implemented some of the functionality described above.

Controller

A controller 46 is provided to allow a user to interact or control the operation of time-shifting buffer capabilities of the SaS module 24 through the controller interface 48. Through the controller 46, a user can implement a host of functions such as the selection of a message among a plurality of messages or the selection of a number of available rendering options, such as: (i) pausing a live a message, (ii) jump backward to review a previous message or messages, (iii) jump to the head (i.e. "live") or the most current message among an exchange of messages between participants, (iv) play recorded messages faster, (v) play recorded messages slower, and (vi) catching up to live by reviewing the stored messages of an exchange of messages at a rate faster relative to the rate the voice media was originally encoded and stored and seamlessly merging into the current live message.

In embodiments where the SaS module 24 is provided on an end-user communication device, the controller 46 is designed to interface with any number of user input control or selection features provided on the end-user communication device itself. Control or selection features, such as a touch screen graphical user interface, touch input controls, knobs, a keyboard, slide bars, etc. may be provided enter rendering and other control commands to the SaS module 24 through the controller 46.

In embodiments where the SaS module 24 is provided at a network communication device, the controller 46 is configured to receive control signals over the network. For example, a user of an end-user communication device may remotely operate the controller 46 on the SaS module 24 on the network through various control functions using Dual-Tone Multi-Frequency tones, Short Message Service (SMS) messages, or some other out-of-band signaling mechanism. With PTT applications for example, the controller 46 enables a user to remotely interact with the SaS module 24 to implement a wide variety of new functions. For example, PTT users can control the SaS module 24 to skip forward and backward on a per-message basis as well as the rendering controls described above within each message (e.g., play faster, play slower, etc.). Incoming messages may still be played as they are received, but all received messages will be stored for later review at an arbitrary later time defined by the receiving user. If a user is reviewing an old message, while a new message is received, an indication or flag may be provided through the controller 46. By manipulating the controller 46, users have the option of reviewing other messages simultaneously with the arrival of new messages or serializing the review of incoming messages. Users can also replay messages that were missed without asking the sending party to retransmit. In yet another embodiment, a "do not disturb" mode can be set where incoming transmissions are recorded and queued for later review without being immediately played or rendered. The controller 46 also allows a sender to review their sent messages, in addition to any received messages.

Operation Flow Diagrams

Figure 2B:
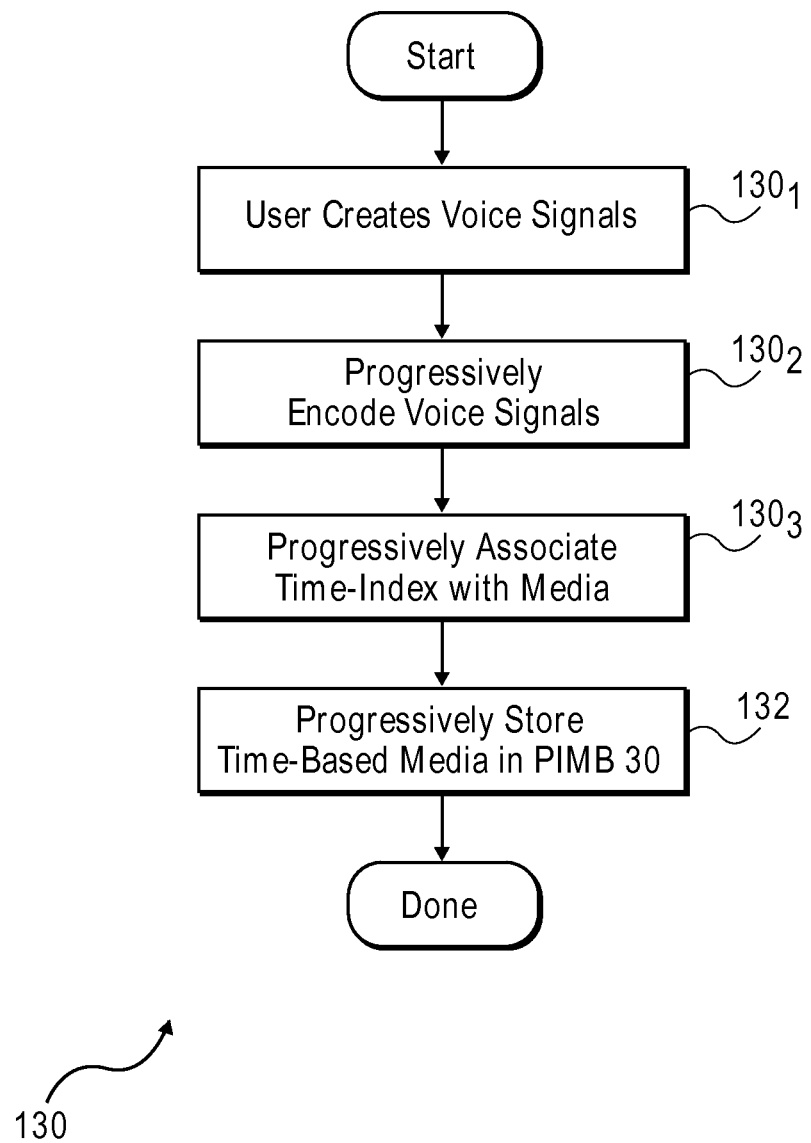
Figure 2C:
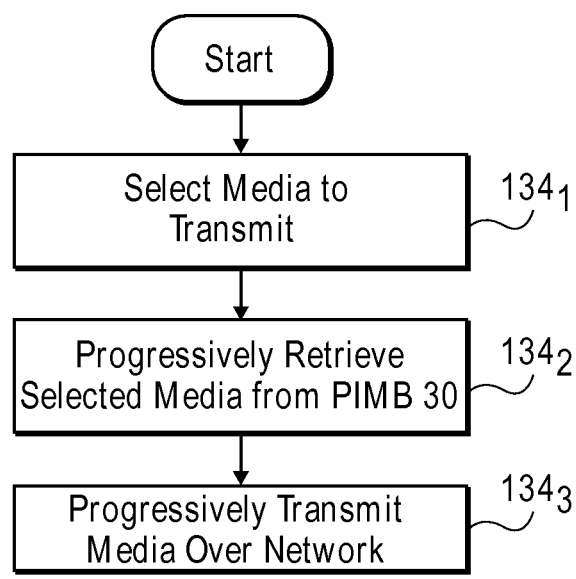
Figure 2D:
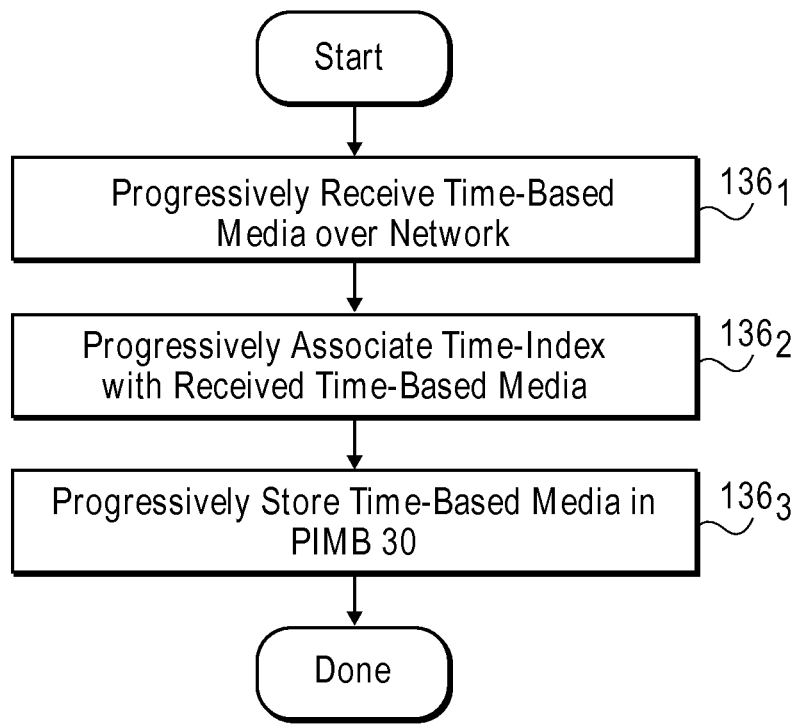
Figure 2E:
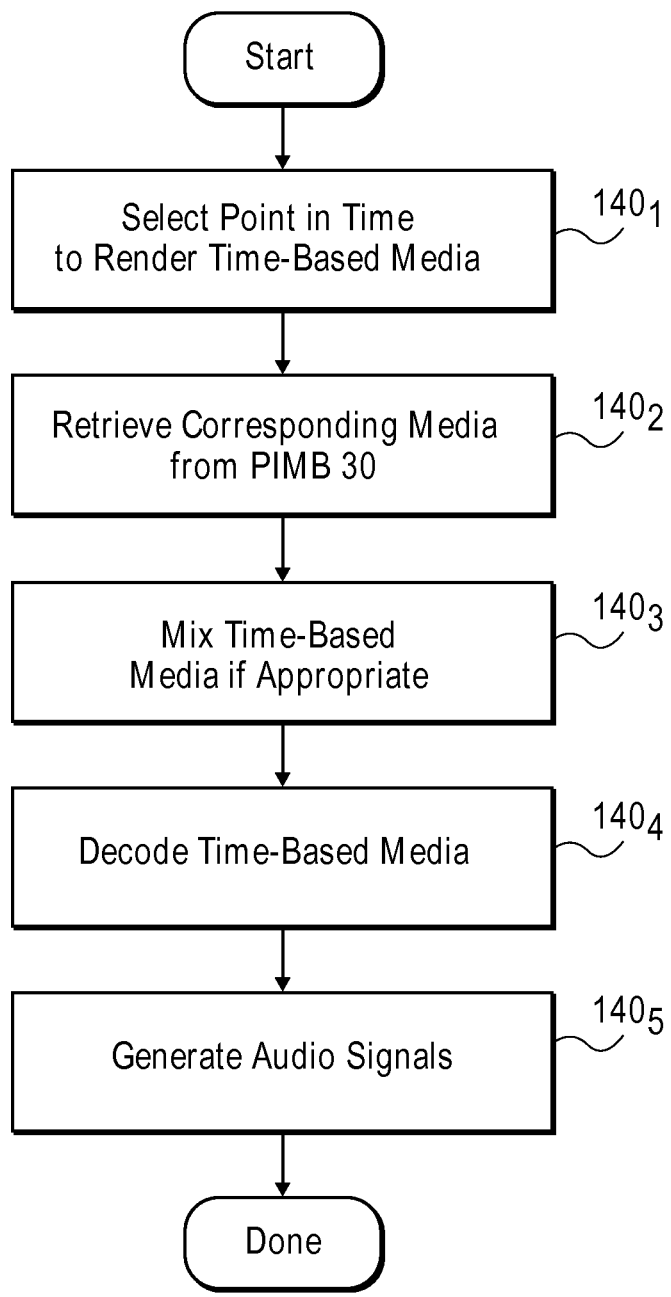

Referring to FIGS. 2A through 2E, a series of flow diagrams are provided to illustrate the operation of the SaS module 24 on end-user transmitting and receiving communication devices. FIG. 2A shows the sequence of operation of the SaS module when a user transmits messages to a recipient. FIGS. 2B and 2C illustrate the operation of the PIMB writer 28 and PIMB Reader 26 during transmission. FIGS. 2D and 2E illustrate the operation of the PIMB Writer 28 and PIMB Reader 26 when the SaS module 24 receives a message. The flow charts below are described in the context of voice media. It should be understood that the flow charts operate in a similar manner for other types of time-based media, such as video, positional or GPS data, or other sensor data (e.g., temperature, pressure, etc.).

In FIG. 2A, a user creates messages to be transmitted by speaking into the microphone of their end-user communication device. With the Encode Receive function, the voice signals of the message are encoded as the user speaks by the PIMB Writer 28 (box 130), which converts the voice into electrical signals and stores the electrical signals in the PIMB 30 (box 132) as Media in a time-indexed format. With the Transmit function, the PIMB Reader 26 transmits the message to the recipient participant(s) over the network 133. At the receiving SaS module 24, the Net Receive function of the PIMB Writer 28 receives the message (box 136) and stores the message as time-based media into the PIMB 30 on the receive SaS module 24. The Render function of the PIMB reader 26 on the receive side renders the time-based media from the PIMB 30 into a medium suitable for human consumption, such as voice or video. Each of these steps are described in more detail below with respect to FIGS. 2B through 2E.

In FIG. 2B, the sequence of the Encoder Receive function performed by the PIMB Writer 28 (step 130 of FIG. 2A) is provided in detail. In the initial step $130_1$, the transmitting user originates the voice signals or a message to be transmitted, by for example, speaking into a microphone. In the next step $130_2$, the Encode Receiver 28a progressively encodes the voice signals as they are being created. The Media Storer 28b associates a time-index with the encoded signals as the person is speaking (step $130_3$) and then progressively stores the media in the PIMB 30 (step $132_4$) in a time-indexed format.

In FIG. 2C, the sequence of the Transmit function performed by the PIMB Reader 26 (step 134 of FIG. 2A) on the sending SaS module 24 is provided in detail. In the initial step $134_1$, the media to be transmitted is selected by the Media Retriever 26i. If the selected media is the media that is currently being created on the end user device, then the Transmitter 26j progressively transmits the media in various embodiments either just before, just after or at substantially the same time as the media is stored in the PIMB 30 by the Encode Receive function. Regardless of the embodiment, the media is transmitted without a perceptible delay. As a result, the recipient(s) may optionally render the media in the real-time mode. Alternatively, the user may select media for transmission over the network from the PIMB 30 (step $134_3$) that was previously stored. For example, a user may select an old message and transmit it over the network. In this latter case, the Transmitter 26j retrieves the media from the PIMB starting at the selected point and progressively transmits the media from storage.

In FIG. 2D, the sequence for the Net Receive function (step 136 of FIG. 2A) of the PIMB Writer 28 of the receive SaS module 24 is illustrated. In the initial step $136_1$, the Network Receiver 28c progressively receives the time-based media of the message over the network. As necessary the incoming media is buffered by the Media Bufferer 28d. The Media Storer 28e progressively associates the time-index for the received media (step $136_2$) and then progressively stores media in the PIMB 30 (step $136_3$) in the time-indexed format.

In FIG. 2E, the sequence for the Render function of the PIMB Reader 26 (box 140 of FIG. 2A) on the receive SaS module 24 is illustrated. In the initial step $140_1$, the media (e.g., a message) at a point in time is selected. The Media Retriever 26f then progressively retrieves the media from the PIMB 30 starting at the selected point of time (step $140_2$). The retrieved time-based media is then progressively mixed by the Media Mixer 26g if appropriate (step $140_3$). In the next step, the Decoder 26h progressively decodes either the mixed or non-mixed media (step $140_4$) into electrical signals suitable for the hardware driver 34, which drives a media-generating device such as a speaker or video display (step $140_5$) to generate audio or video.

In the real-time mode, the media selected for rendering is the media being progressively received. In various embodiments of the Net Receive and Render functions, an incoming message may be time-indexed and stored in the PIMB either just before, just after or at substantially the same time the media is being rendered at the end-user device of the recipient. In either case, the delay associated with storing the media is very small. As a result, the recipient may render the media live in the real-time mode. In the time-shifted mode, the media is selected from a previous point in time, retrieved from the PIMB 30, and rendered from the selected point forward.

In the context of the present application, the term progressive or progressively is intended to be broadly construed and generally mean the continuous processing of a data stream based on availability of the data. For example as a person speaks, their voice is continuously encoded, stored, and transmitted, so long as the voice media is being created. When the person pauses or stops speaking, there is no voice media to continuously process. But when the person resumes speaking again, the progressive processing and transmission of the voice media resumes. On the receive side, the media is also progressive processed (i.e. stored) in any recipient SaS module, either on the network in a network communication device or at a recipient ender user communication device. Further if a recipient has indicated they would like to review the media in the real-time mode, then any intermediate network communication device will continuously or progressively transmit media to the recipient, so long as the media is available. The recipient end-user communication device also continually renders the media as it is progressively received, so long as the media is available.

The flow diagrams 2A through 2E describe the operation of the SaS module 24 on an end-user communication device as noted above. The operation of the SaS module 24 on the network in a network communication device operates essentially the same, except for two notable exceptions. Since media is typically not created or rendered on the network, the Encode Receive (FIG. 2B) or Render (FIG. 2E) functions are typically not implemented. Instead, only the Transmit (FIG. 2C) and Net Receive (FIG. 2D) functions are required.

Figure 3:
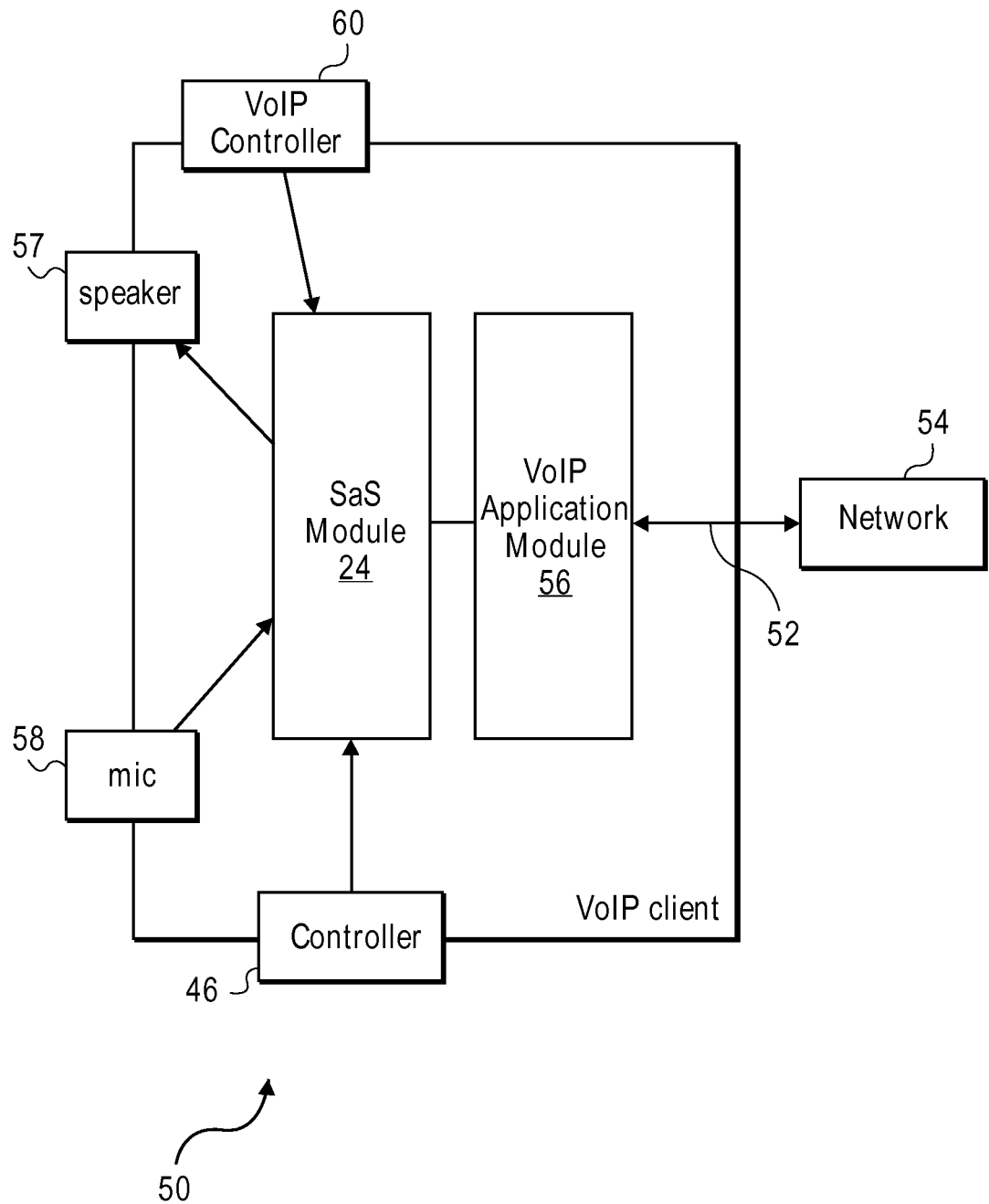
FIG. 3 is a block diagram of the SaS module embedded in a VoIP client in accordance with the present invention.

Referring to FIG. 3, a block diagram of the SaS module embedded in a VoIP client in accordance with one embodiment of the present invention is shown. In this disclosure, "VoIP" should be understood as a system that provides full-duplex voice and/or video communication using the IP protocol. Example of such systems includes SIP, RTP, Skype, H.323, MGCP, IAX2, etc. In this embodiment, the VoIP client 50 includes a network interface 52 to connect the client 50 to a network 54, a VoIP application module 56 for providing the VoIP functionality, a speaker 57, a microphone 58, a VoIP controller 60, the SaS module 24, and the controller 46.

The VoIP application module 56 controls the VoIP functionality of the client 50 as is well known in the art. The SaS module 24, which is provided between the network 54 and the speaker 57 and microphone 58 on the client device 50, provides the time shifting buffer and SaS functionality, as described above, directly on the device. The operation of the SaS module 24 is controlled through the controller 46, also as described above. The VoIP controller 60 controls the standard operation of the VoIP application module 56, as is well known in the art, through the SaS module 24. The standard VoIP controls for call initiation and management are routed through the SaS module 24 first before they are sent to the VoIP application module 56 so that the SaS module 24 can allocate necessary resources for the activities of the VoIP application. With this arrangement, a user of the device sends VoIP related requests to SaS module 24, which in turn, relays them to VoIP application module 56.

Figure 4:
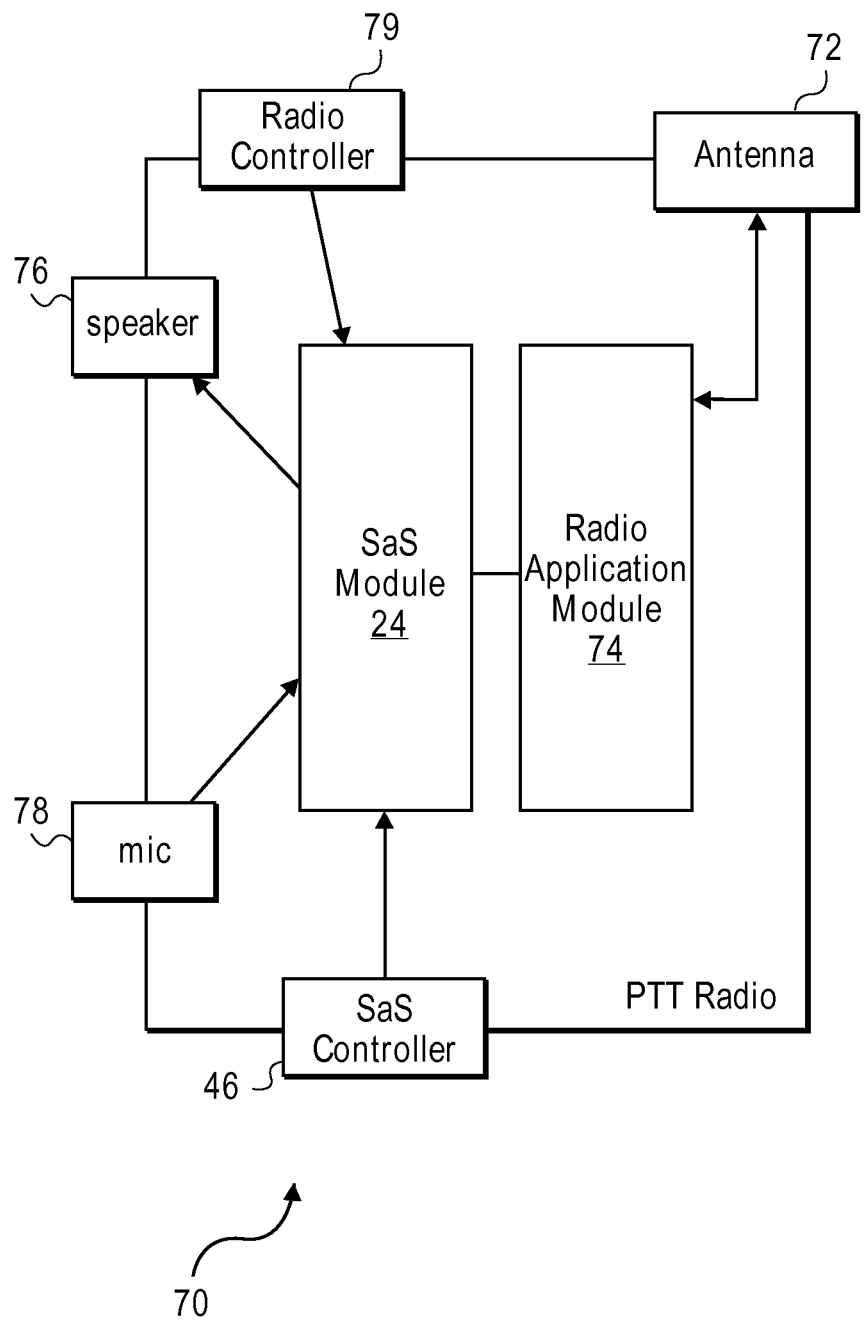
FIG. 4 is block diagram of the SaS module embedded in a Push To Talk (PTT) client according to the present invention.

Referring to FIG. 4, a block diagram of the SaS module embedded in a Push To Talk (PTT) client 70 according another embodiment of the present invention is shown. In this embodiment, the PTT client 70 includes a radio antenna 72 to connect the client 70 to a PTT radio network (not illustrated), a PTT radio application module 74 for providing the PTT functionality, a speaker 76, a microphone 78, a PTT radio controller 79, the SaS module 24, and the controller 46.

The PTT radio application module 74 controls the PTT functionality of the client 70 as is well known in the art. The SaS module 24, which is provided between the PTT radio network (not illustrated) through the antenna 72 and the speaker 76 and microphone 78 on the client device 70, provides the time shifting buffer and SaS functionality, as described above, directly on the device. The operation of the SaS module 24 is controlled through controller 46, also as described above. The PTT radio controller 79 controls the standard operation of the PTT radio application module 74, as is well known in the art, through the SaS module 24.

Figure 5:
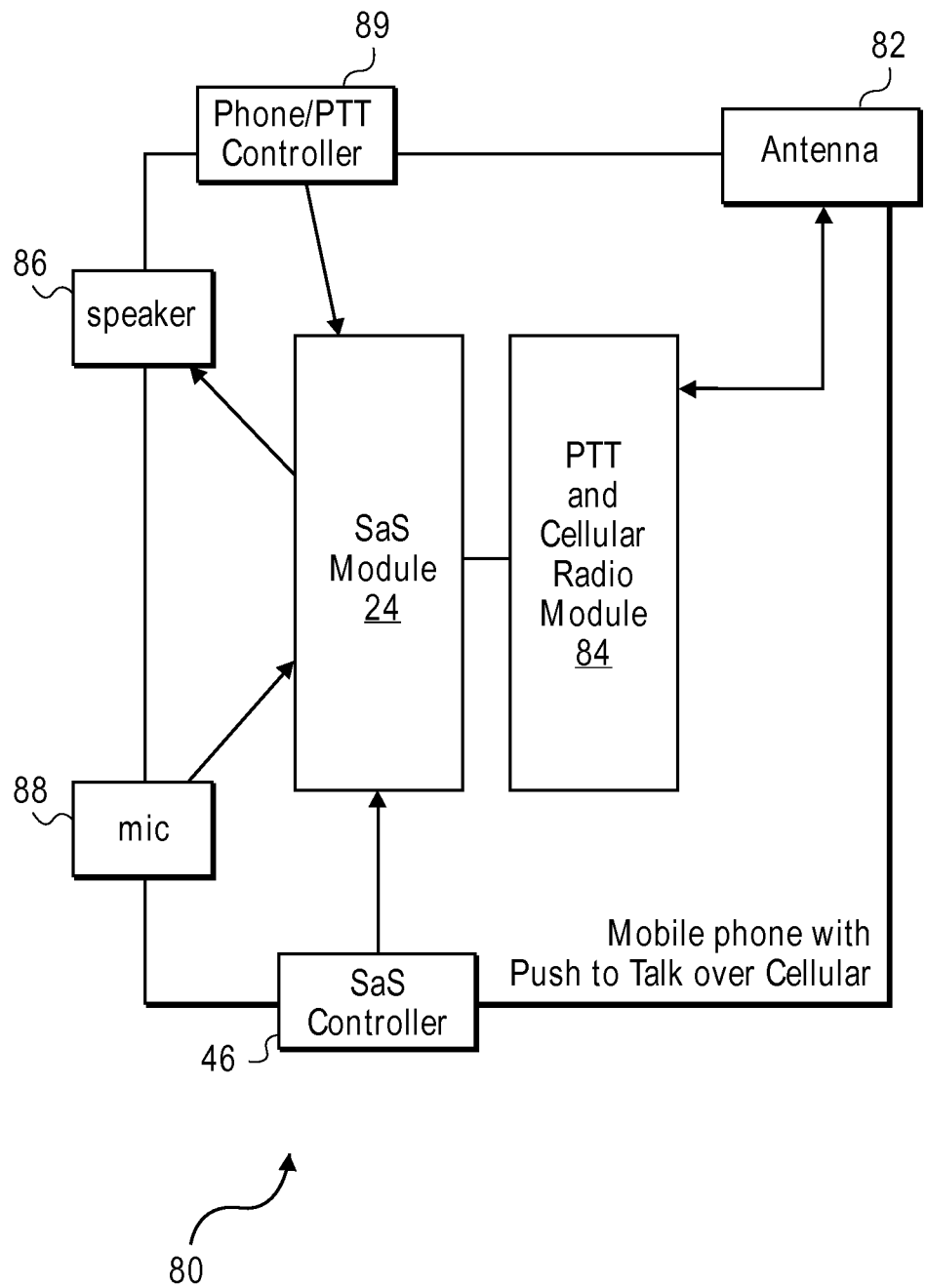
FIG. 5 is a block diagram of the SaS module embedded in a mobile phone with PPT over cellular capabilities according to the present invention.

Referring to FIG. 5, a block diagram of the SaS module embedded in a mobile phone with PPT over cellular capabilities according to another embodiment of the present invention is shown. In this embodiment, the mobile phone with PPT over cellular client 80 includes a radio antenna 82 to connect the client 80 to a cellular network (not illustrated), a PTT and cellular radio module 84 for providing standard cellular and PTT functionality, a speaker 86, a microphone 88, a cellular phone/PTT controller 89, the SaS module 24, and the SaS controller 46.

The PTT and cellular radio module 84 controls PTT and full-duplex voice functionality of the client 80 as is well known in the art. The SaS module 24, which is provided between the cellular radio network (not illustrated) through the antenna 82 and the speaker 86 and microphone 88 on the client device 80, provides the time shifting buffer and SaS functionality, as described above, directly on the device. The operation of the SaS module 24 is controlled through controller 46, also as described above. The cellular phone/PTT radio controller 89 controls the standard operation of the PTT and cellular radio application module 84 through the SaS module 24.

In another embodiment, the SaS module 24 may be provided on a standard mobile phone without the PTT capability and which operates over a cellular network. Such an embodiment would be very similar to the client 80 as illustrated in FIG. 5, except the module 84 and the controller 89 would not have PTT functionality or PTT controls respectively.

Figure 6:
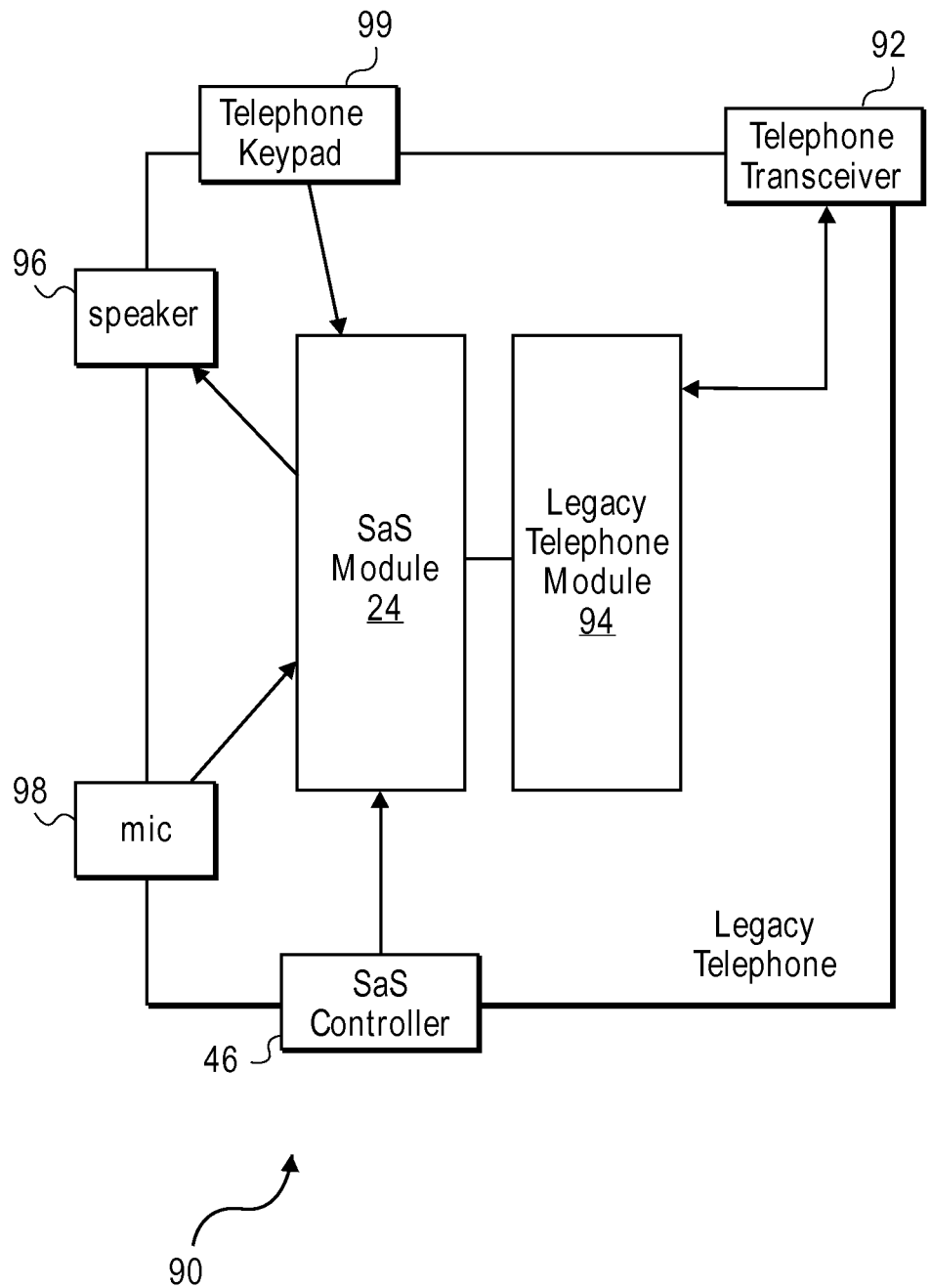
FIG. 6 is a block diagram of the SaS module embedded in a legacy telephone according to the present invention.

Referring to FIG. 6, a block diagram of the SaS module embedded in a legacy telephone according to yet another embodiment of the present invention is shown. In this embodiment, the telephone client 90 includes a legacy telephone transceiver 92 to connect the client 90 to a legacy telephone network (not illustrated), a legacy or standard telephone module 94 for providing standard telephone functionality, a speaker 96, a microphone 98, a telephone keypad 99, the SaS module 24, and the SaS controller 46.

The legacy telephone module 94 controls PTT and full-duplex voice functionality of the client 90 as is well known in the art. The SaS module 24, which is provided between the legacy telephone network (not illustrated) through the transceiver 92 and the speaker 96 and microphone 98 on the client device 90, provides the time shifting buffer and SaS functionality, as described above, directly on the device. The operation of the SaS module 24 is controlled through controller 46, also as described above. The telephone keypad 99 controls the standard operation of the legacy telephone module 84 through the SaS module 24.

In each of the embodiments described above in FIGS. 3 through 6, the SaS module 24 is provided on the client. But as previously noted, the SaS module 24 may be provided on the network, providing legacy land-line phones, mobile phones, PTT radios, and PTT enabled mobile phones with SaS functionality.

Figure 7:
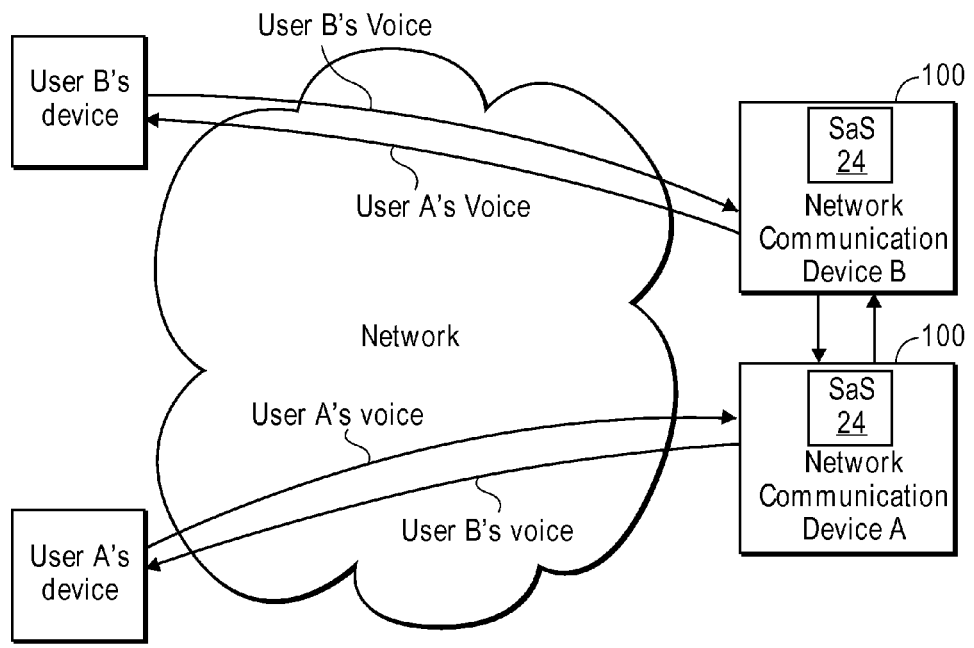
FIG. 7 is a diagram illustrating a full duplex conversation with the SaS module for the participants located on the network between user devices according to the present invention.
Figure 8:
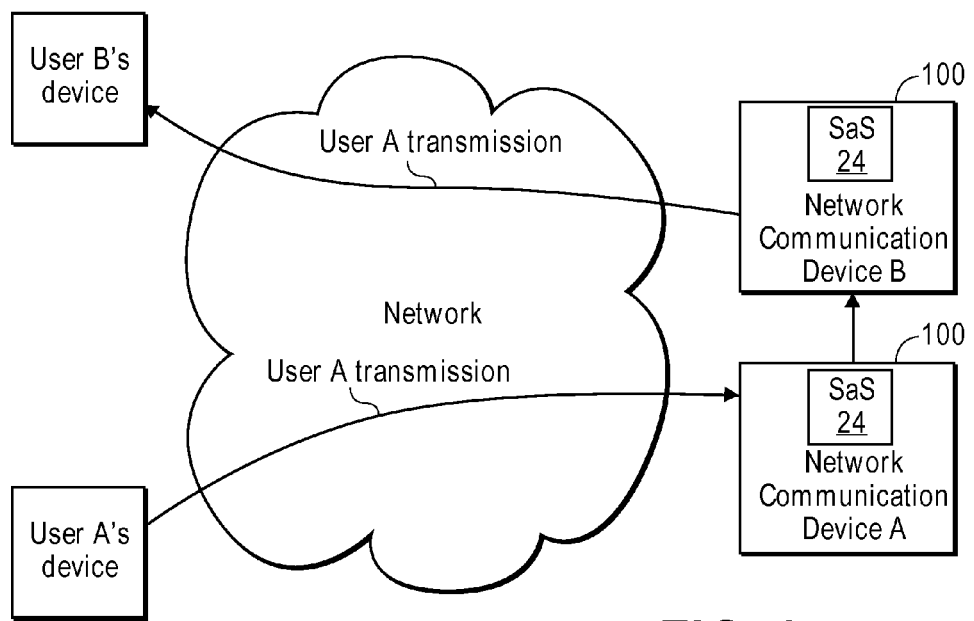
FIG. 8 is a diagram of illustrating a PTT transmission with the SaS module located on the network.

Referring to FIG. 7, a diagram illustrating a full-duplex conversation where the SaS modules 24 for the participants are located on the network is shown. In this embodiment, two non-SaS enabled end-user devices A and B are engaged in a full-duplex conversation and two network communication devices 100, each including an SaS module 24, are provided on the network for user A and B respectively. With this arrangement, media transmitted by user A to user B is transmitted using a first channel. A second channel is used for transmissions from user B to user A. Any transmissions on the first and second channels are stored in the SaS modules 24 of the two network communication devices 100 respectively. FIG. 8 is a diagram illustrating a half-duplex PTT system with two network communication devices 100, each including an SaS module 24, for storing the transmissions from end user device A to end user device B (e.g., conventional PTT devices).

With the embodiments shown in both FIGS. 7 and 8, user B controls its respective SaS module 24 through various control functions using DTMF tones, SMS messages, or some other out-of-band signaling mechanism. The controller 46 of the SaS module 24 corresponding to user B, in response to the control signals received from the communication device of user B, is configured to control the rendering of the time-based media from user A at the communication device of user B in either the near real-time or time-shifted modes.

In the near real-time mode, as the time-based media is progressively received at the SaS module 24 from the communication device A, it is progressively stored in the PIMB 30 and progressively transmitted to the communication device B for immediate rendering. As a result, user B has a "real-time" experience when reviewing or rendering the media.

On the other hand in the time-shifted mode, the transmission is not immediately rendered at device B as it is being transmitted by device A. For example, if user B is not available, or intentionally wishes not to review a transmission from user A in real-time, then the transmission is received and stored in the PIMB 30 of the SaS module 24 corresponding to user B, but is not progressively forwarded to the device of user B. At some later time arbitrary defined by user B, the media of the missed transmission may be reviewed.

To review the media in the time-shifted mode, user B generates control signals requesting the message. In response, the SaS module 24 retrieves the time-based media of the message from the PIMB 30 and progressively transmits the retrieved time-based media to the communication device of user B for rendering. In addition, user B may further generate a number of control signals to select any number of rendering options besides simply playing the time-based media, such as pausing time-based media as it is being rendered, jump backward to review previous time-based media, jump to the most current time-based media, play the time-based media either faster or slower than it was originally encoded and catch up to live.

User B may also seamlessly transition between the near-real-time and time-shifted modes. For example, user B may pause or stop the rendering of a message from user A in the real-time mode. In this situation, user B may subsequently review the message at an arbitrary later time in the time-shifted mode. Alternatively, user B may be reviewing an old message from user A when a new message arrives. If this occurs, user B may stop the review of the old message and immediate transition to the review of the new message as the media arrives in the real-time mode. Alternatively, user B can implement the catch up to live feature, speeding up the rendering of the old media until caught up with the new media as it progressively arrives over the network. In either case, user B seamlessly transitions from the time-shifted mode to the near real-time mode.

Although not described in detail herein, user A may review transmissions from user B in either the real-time or time-shifted modes, and with all the same rendering controls, in a similar manner as described above. In an alternative embodiment, a single network communication device 100 may support both end user devices A and B for the embodiments shown in FIG. 7 or 8 respectively. With this embodiment, although there is only one network communication device 100, at least a dedicated PIMB would typically be provided for each user A and B respectively. In yet other embodiments, each communication device 100 may each support multiple users besides A and B in either a half-duplex or full-duplex arrangement. In either case, again at least a dedicated PIMB would typically be provided the for each user respectively. In situations where SaS modules support multiple users, transmit and receive functions may be shared. But each user would ideally have a separate PIMB or a dedicated portion of a larger PIMB. Also with the embodiments shown in FIGS. 7 and 8, either or both user devices A and B may have their own SaS modules 24.

Although the above description was generally provided in the context of voice media, it should be understood that all types of time-based media could be processed in a similar manner. SaS modules 24, regardless of their location, can process other types of time-based media, such as other audio content besides voice, video, GPS or positional data, or sensor data such as time, temperature, pressure, etc.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method performed on a communication network, the method comprising:

progressively storing voice media received at a node on a communication network during PTT transmissions exchanged between a first PTT communication device and a second PTT communication device over the communication network as the voice media is progressively received at the node;

progressively transmitting the voice media received at the node during the PTT transmissions exchanged between the first and second PTT communication devices:

(a) from the first PTT communication device to the second PTT communication device as the voice media is progressively received and stored at the node when the second PTT communication device is available on the network; and (b) from the second PTT communication device to the first PTT communication device as the voice media is progressively stored at the node when the first PTT communication device is available on the network;

progressively transmitting the voice media received from the first PTT communication device out of storage on the node to the second PTT communication device when:

(i) the second PTT communication device is unavailable on the network when the voice media is received and stored at the node; and (ii) in response to a request from the second PTT communication device after the second PTT communication device becomes available on the network;

progressively transmitting the voice media received from the second PTT communication device out of storage on the node to the first PTT communication device when:

(iii) the first PTT communication device is unavailable on the network when the voice media is received and stored at the node; and (iv) in response to a request from the first PTT communication device after the first PTT communication device becomes available on the network; and providing an application that is embedded in a non-transient computer readable medium to the first PTT communication device, the application configured to:

(1) enable the progressive storage on the first PTT communication device the voice media that is created on the first PTT communication device;

(2) enable the progressive transmission of the voice media created on the first PTT communication device as the voice media is created and progressively stored on the first PTT communication device if a network connection is established for the first PTT communication device when the voice media is created on the first PTT communication device; and (3) enable the progressive transmission of the voice media created on the first PTT communication device out of storage on the first PTT communication device after the first PTT communication device establishes the network connection if the network connection was not established for the first PTT communication device when the voice media was created on the first PTT communication device.

2. The method of claim 1, wherein progressively storing the voice media at the node further comprises progressively and persistently storing the voice media at the node, wherein persistently stored means for a time period beyond what is needed to deliver the voice media to the first PTT communication device or the second PTT communication device respectively.

3. The method of claim 1, wherein progressively storing the voice media at the node further comprises progressively storing the voice media in a time-indexed format so that the voice media can be retrieved from storage in time-order.

4. The method of claim 1, wherein the application is further configured to enable progressive storage of the voice media progressively received over the communication network from the second PTT communication device as the voice media is progressively received over the communication network.

5. The method of claim 1, wherein the application includes a rendering module configured to enable selective rendering of the voice media received over the communication network from the second PTT communication device both:

(i) in near real-time by progressively rendering the voice media as the voice media is received; and (ii) at an arbitrary later time by rendering the received voice media out of storage on the first PTT communication device.

6. The method of claim 5, wherein the rendering module provides one or more of the following rendering options: play, pause, jump backward, jump to the most current voice media, play faster, play, and catch up to live.

7. The method of claim 1, further comprising supporting half-duplex communication over the communication network between the first PTT communication device and the second PTT communication.

8. The method of claim 1, further comprising supporting time-shifted communication over the communication network by enabling the first PTT communication device and the second PTT communication device to render the voice media exchanged between the two PTT communication devices some time after the exchanged media was transmitted.

9. The method of claim 8, wherein supporting time-shifted communication further comprises enabling users of the two PTT communication devices to render the exchanged voice media out of storage some time after the exchanged media was transmitted by the two PTT communication devices respectively.

10. The method of claim 1, wherein the first PTT communication device comprises one of the following: a computer, a PTT radio, a mobile phone, a telephone.

11. The method of claim 1, wherein, besides voice media, the media exchanged between the two PTT communication devices and stored at the node comprises one or more of the following:

(i) video media;
(ii) image media;

(iii) GPS or positional data;
(iv) sensor data; or
(v) text media.

12. The method of claim 1, wherein the first PTT communication device is a communication device that transmits voice media created on the communication device in response to the activation of a PTT function located on the communication device.

13. The method of claim 1, wherein the voice media that is progressively transmitted by either of the two PTT communication devices is in a PTT format and is progressively received by the other of the two communication devices in the PTT format.

14. A communication system comprising:
a node located on a communication network, the node configured to progressively store PTT voice media transmissions between a first PTT communication device and a second PTT communication device exchanged over the communication network as the voice media is progressively received at the node, the node further configured to:
progressively transmit the voice media received at the node during the PTT transmissions exchanged between the first and the second PTT communication devices
(a) from the first PTT communication device to the second PTT communication device as the voice media is progressively received and stored at the node when the second PTT communication device is available on the network; and
(b) from the second PTT communication device to the first PTT communication device as the voice media is progressively received and stored at the node when the first PTT communication device is available on the network;
progressively transmit the voice media received from the first PTT communication device out of storage on the node to the second PTT communication device when:
(i) the second PTT communication device is unavailable on the network when the voice media is received and stored at the node; and
(ii) in response to a request from the second PTT communication device after the second PTT communication device becomes available on the network; and
progressively transmit the voice media received from the second PTT communication device out of storage on the node to the first PTT communication device when:
(iii) the first PTT communication device is unavailable on the network when the voice media is received and stored at the node; and
(iv) in response to a request from the first PTT communication device after the first PTT communication device becomes available on the network; and
providing an application that is embedded in a non-transient computer readable medium to the first PTT communication device, the application configured to:
(1) enable the progressive storage on the first PTT communication device the voice media that is created on the first PTT communication device;
(2) enable the progressive transmission of the voice media created on the first PTT communication device as the voice media is created and progressively stored on the first PTT communication device if a network connection is established for the first PTT communication device when the voice media is created on the first PTT communication device; and
(3) enable the progressive transmission of the voice media created on the first PTT communication device out of storage on the first PTT communication device after the first PTT communication device establishes the network connection if the network connection was not established for the first PTT communication device when the voice media was created on the first PTT communication device.

15. The system of claim 14, wherein the progressive storage of the voice media at the node further comprises progressively and persistently storing the voice media at the node, wherein persistently stored means for a time period beyond what is needed to deliver the voice media to the first PTT communication device or the second PTT communication device respectively.

16. The system of claim 14, wherein the progressive storage of the voice media at the node further comprises progressively storing the voice media in a time-indexed format so that the voice media can be retrieved from storage in time-order.

17. The system of claim 14, wherein the application is further configured to enable progressive storage of the voice media progressively received over the communication network from the second PTT communication device as the voice media is progressively received over the communication network.

18. The system of claim 14, wherein the application includes a rendering module configured to enable selective rendering of the voice media received over the communication network from the second PTT communication device either:
(i) in near real-time by progressively rendering the voice media as the voice media is received; and
(ii) at an arbitrary later time by rendering the received voice media out of storage on the first PTT communication device.

19. The system of claim 18, wherein the rendering module provides one or more of the following rendering options: play, pause, jump backward, jump to the most current voice media, play faster, play, and catch up to live.

20. The system of claim 14, wherein the system is further configured to support half-duplex communication over the communication network between the first PTT communication device and the second PTT communication device.

21. The system of claim 14, further comprising supporting time-shifted communication over the communication network by enabling the first PTT communication device and the second PTT communication device to render the voice media exchanged between the two PTT communication devices some time after the exchanged media was transmitted.

22. The system of claim 21, wherein supporting time-shifted communication further comprises enabling users of the two PTT communication devices to render the exchanged voice media out of storage some time after the exchanged media was transmitted by the two PTT communication devices respectively.

23. The system of claim 14, wherein the first PTT communication device comprises one of the following: a computer, a PTT radio, a mobile phone, a telephone.

24. The system of claim 14, wherein, besides voice media, the media exchanged between the two PTT communication devices and stored at the node comprises one or more of the following:
(i) video media;
(ii) image media;
(iii) GPS or positional data;
(iv) sensor data; or
(v) text media.

25. The system of claim 14, wherein the first PTT communication device is a communication device that transmits voice media created on the communication device in response to the activation of a PTT function located on the communication device.

26. The system of claim 14, wherein the voice media that is progressively transmitted by either of the two PTT communication devices is in a PTT format and is progressively received by the other of the two communication devices in the PTT format.

* * * * *